(12) United States Patent
Chen et al.

(10) Patent No.: US 8,842,883 B2
(45) Date of Patent: Sep. 23, 2014

(54) GLOBAL CLASSIFIER WITH LOCAL ADAPTION FOR OBJECTION DETECTION

(71) Applicant: Seiko Epson Corporation, Tokyo (JP)

(72) Inventors: Guang Chen, Columbia, MO (US);
Yuanyuan Ding, Santa Clara, CA (US);
Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 120 days.

(21) Appl. No.: 13/677,192

(22) Filed: Nov. 14, 2012

(65) Prior Publication Data

US 2013/0129143 A1    May 23, 2013

Related U.S. Application Data

(60) Provisional application No. 61/562,123, filed on Nov. 21, 2011.

(51) Int. Cl.
*G06K 9/00*    (2006.01)
*G06K 9/62*    (2006.01)
*G06F 17/30*   (2006.01)

(52) U.S. Cl.
CPC ............ *G06K 9/6267* (2013.01); *G06K 9/6218* (2013.01)
USPC ............................ 382/103; 382/224; 707/749

(58) Field of Classification Search
CPC .................................. G06F 17/03; G06K 9/00
USPC ......... 382/100, 103, 106–107, 155, 159, 168, 382/173, 181, 190–192, 206, 209, 224, 232, 382/254, 274, 276, 291, 305, 312; 707/749; 600/450; 706/12, 20
See application file for complete search history.

(56) References Cited

U.S. PATENT DOCUMENTS

| | | | |
|---|---|---|---|
| 6,892,189 B2 * | 5/2005 | Quass et al. | 706/12 |
| 7,127,083 B2 | 10/2006 | Han et al. | |
| 7,480,414 B2 | 1/2009 | Brown et al. | |
| 7,970,718 B2 * | 6/2011 | Guyon et al. | 706/20 |
| 8,092,388 B2 * | 1/2012 | Park et al. | 600/450 |
| 8,396,286 B1 * | 3/2013 | Aradhye et al. | 382/159 |
| 2011/0182497 A1 | 7/2011 | Uliyar et al. | |
| 2011/0200230 A1 | 8/2011 | Lüke et al. | |
| 2012/0173549 A1 * | 7/2012 | Bouguet et al. | 707/749 |

OTHER PUBLICATIONS

Wu, D., et al., "A Min-Max Framework of Cascaded Classifier with Multiple Instance Learning for Computer Aided Diagnosis", IEEE Conference on Computer Vision and Pattern Recognition, 2009.*
Viola, P., et al., "Rapid Object Detection Using a Boosted Cascade of Simple Features", Proceedings of the IEEE Computer Society Conference on Vision and Pattern Recognition, 2001.
Felzenszwalb, P.F., et al., "Cascade Object Detection with Deformable Part Models", IEEE Conference on Computer Vision and Pattern Recognition 2010.

* cited by examiner

*Primary Examiner* — Seyed Azarian

(57) ABSTRACT

Aspects of the present invention include object detection training systems and methods and using object detection systems and methods that have been trained. Embodiments presented herein include hybrid learning approaches that combine global classification and local adaptations, which automatically adjust model complexity according to data distribution. Embodiments of the present invention automatically determine model complexity of the local learning algorithm according to the distribution of ambiguous samples. And, embodiments of the local adaptation from global classifier avoid the common under-training problem for local classifier.

18 Claims, 21 Drawing Sheets

500

Obtain a set of clusters of ambiguous data and a global classifier — 505

For each cluster, obtain a classifier by modifying the global classifier using data in the cluster — 510

Apply a global classifier to obtain a response for each of a set of image patches ⟋ 905

Based upon response value, classify the responses into one of three groups or categories: positive, negative, or ambiguous ⟋ 910

For each image patch that was categorized as ambiguous, identify the closest cluster and use its classifier to obtain a response value to classify it ⟋ 915

FIGURE 9

GLOBAL CLASSIFIER WITH LOCAL ADAPTION FOR OBJECTION DETECTION

CROSS-REFERENCE TO RELATED APPLICATION

This application claims the priority benefit under 35 USC §119(e) to commonly assigned U.S. Patent Application No. 61/562,123, filed on Nov. 21, 2011, entitled "Divide with Global Classifier, Conquer with Local Adaptation—A Hybrid Approach to Object Detection", and listing as inventors Guang Chen, Yuanyuan Ding, and Jing Xiao. The aforementioned patent document is incorporated by reference herein in its entirety.

BACKGROUND

1. Field of Invention

The present patent document is directed towards systems and methods for object detection. More particularly, the present patent document is directed towards systems and methods for generating and using object detection models for recognizing objects in an image (video or still image).

2. Description of the Related Art

Object detection from images can be important to many applications, such as surveillance, robotics, manufacturing, security, medicine, and automotive safety—just to name a few areas of application. However, object detection is among the most challenging vision tasks.

Among various approaches to object detection, the sliding window approach dominates due to its good performance, efficiency, parallelizability, and easy implementation. Sliding-window-based detectors treat object detection as a classification problem. Typically, the whole image is densely scanned from the top left to the bottom right with rectangular scanning windows of different sizes. For each possible scanned rectangle, certain features such as edge histogram, texture histogram, shape-based features, pose-invariant features, wavelet coefficients, or combinations thereof are extracted and supplied to an offline trained classifier that has been trained using labeled training data. The classifier is trained to classify any rectangle bounding an object of interest as a positive sample and to classify all other rectangles as negative samples.

The performances of sliding-window-based detectors are mainly determined by two factors: the feature and the underlying classification algorithm. Many supervised learning algorithms such as various boosting algorithms, Support Vector Machine (SVM) of different flavors including linear, kernel, multi-kernel, latent, structured, etc., and Convolutional Neural Networks (CNN), have been applied to object detection during the past decade. The selection of underlying classifier/regressor is determined by various factors including the feature, the distribution of the training data, and the computational complexity.

To ensure the detector has enough learning capacity to learn from training data and can be generalized well, people frequently resort to the Occam's razor principle to select underlying classifiers—namely, they want to pick up a classifier, as simple as possible, with good performance on training data. A key issue, with a spectrum of classifiers with different model complexity, is whether it is possible to automatically pick up a classifier with appropriate complexity and to learn the corresponding model parameters. When the distribution of data in the input space is uneven, local learning algorithms can adjust the learning capacity locally to improve the overall performance. Various approaches have been proposed to tackle the problem of high variance of data complexity in input space. For example, at least one method has been proposed that uses Support Vector Machine (SVM)-k-Nearest Neighbor (KNN) (SVM-KNN) that attempts to handle this problem but at the expense of high computational complexity. Local learning algorithms are superior in adjusting the learning capacity according to the local data distribution. Alternatively, when the data distribution can be effectively approximated using a number of clusters, algorithms based on tree or forest models have been successfully used that yields high performance. During training, a hierarchical discriminative tree model is recursively constructed in which each node contains a cluster of data that are then separated by using classifiers learned from the cluster exclusively.

However, three main difficulties still exist in real world applications. First, probing the local data distribution is computationally prohibitive. For example, some of the prior methods rely on the k-Nearest Neighbor (KNN) algorithm to guide the local classifiers for each testing sample. The probing procedure limits the application of the algorithms in large scale learning practice such as object detection. Second, the localities depend on data distribution. In KNN-based algorithms, a region with a simple distribution should be covered with a relatively small K whereas a region with a complicated distribution should be covered with a large K. The "K" in the KNN algorithm is a constant and cannot fulfill such an adaptive task. Third, the performance of an exclusively learned local classifier relies on the population of the cluster while ignoring the potential strength it could borrow from data in other clusters. In tree-based methods, for example, complex data distributions may lead to low-population clusters, making the exclusively learned local classifiers potentially under trained.

Accordingly, systems and methods are needed that can address these difficulties and produce better detection results when trying to detect an object or item in an image (still image or video image).

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

FIG. 5 depicts a general overview of the local learning adaptation according to embodiments of the present invention.

FIG. 9 depicts a method for detecting one or more objects in an image or images that may be executed by the system of FIG. 8 according to embodiments of the present invention.

FIG. 10A details performances of local linear SVM learning with k-means clustering, where k varies from 1 to 2000, according to embodiments of the present invention. FIG. 10B shows performance achieved by clustering methods according to embodiments of the present invention, compared with the best results in FIG. 10A. FIG. 10C compares performances achieved by two different local learning methods according to embodiments of the present invention.

FIG. 11A details performances of local linear SVM learning with k-means clustering, where k varies from 1 to 2000, according to embodiments of the present invention. FIG. 11B shows performance achieved by clustering methods according to embodiments of the present invention, compared with the best results in FIG. 11A. FIG. 11C compares performances achieved by two different local learning methods according to embodiments of the present invention.

DESCRIPTION OF THE PREFERRED EMBODIMENTS

Figure 1:
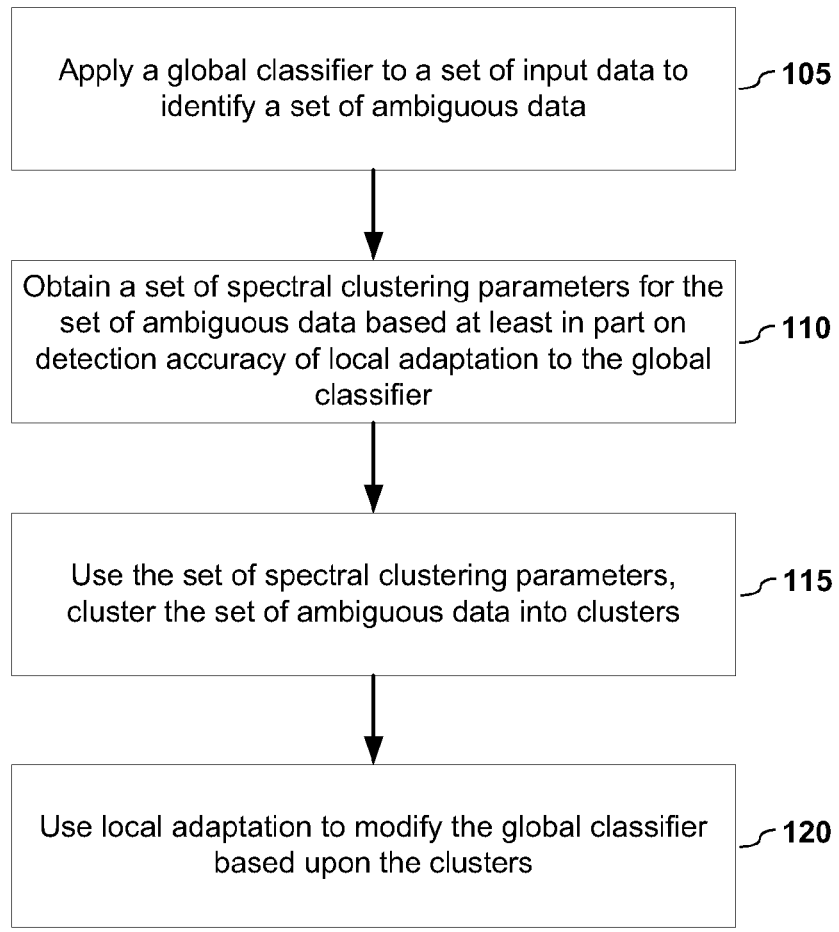
FIG. 1 depicts an overview of a method for detecting an object according to embodiment of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "sequence" in this patent document shall include any number of elements. Furthermore, it shall be noted that methods or algorithms steps may not be limited to the specific order set forth herein; rather, one skilled in the art shall recognize that certain steps may be performed in different orders, including being done contemporaneously.

It shall be noted that although embodiments described herein have been within the context of object detection in images (still or video), the invention elements of the current patent document are not so limited. Accordingly, the invention elements may be applied or adapted for use in other contexts and/or on other input sensor data.

1. Introduction and Overview

As noted above, prior methods are presented with at least three main difficulties. First, probing the local data distribution is computationally prohibitive. Second, the localities depend on data distribution. And third, the performance of an exclusively learned local classifier relies on the population of the cluster while ignoring the potential strength it could borrow from data in other clusters.

To tackle these difficulties, the current patent document presents hybrid learning systems and methods that combine the global classification and the local adaptations, which automatically adjusts the model complexity according to the data distribution. In embodiments, the data samples are divided into two groups, easy samples (either clearly positive or clearly negative) and ambiguous samples, using a learned global classifier. In embodiments, a local adaptation approach, such as one based on spectral clustering and Min-Max model adaptation, may then be applied to further process the ambiguous samples.

FIG. 1 depicts an overview of a hybrid methodology for detecting an object according to embodiment of the present invention. As shown in FIG. 1, a pre-trained global classifier is applied to a set of input data to identify (105) a set of ambiguous data. Having identified a set of ambiguous data, an issue is how to cluster the data. Accordingly, in embodiments, a set of spectral clustering parameters are obtained (110) for the set of ambiguous data based, at least in part, upon the detection accuracy. In embodiments, the detection accuracy may include considering local adaptation to the global classifier. The set of spectral clustering parameters may then be used to cluster (115) the set of ambiguous data into clusters. Finally, in embodiments, local adaptation may be employed (120) to modify the global classifier based upon the clusters, thereby improving the overall classification.

One skilled in the art shall recognize that the ideas behind these hybrid methodologies are straightforward: 1) easy regions can be handled by a global classifier and do not need local learning; 2) data in hard regions can be clustered and the cluster number can be optimized based on their affinity matrix using regular or accelerated spectral clustering; and 3) the local classifiers can leverage on the global classifier to avoid under-training.

Taking human detection as a testbed, using datasets under different scenarios (including: Caltech pedestrian dataset as discussed in P. Dollár, C. Wojek, B. Schiele, and P. Perona, "Pedestrian detection: An evaluation of the state of the art," in IEEE Pattern Analysis and Machine Intelligence (PAMI), 2011 (hereinafter, "Ref. 1"); self-collected large pedestrian dataset; and INRIA dataset as provided in N. Dalal, B. Triggs, "Histograms of oriented gradients for human detection," IEEE Computer Vision and Pattern Recognition (CVPR), page 1:886-893, 2005 (hereinafter, "Ref. 2")) (each of the foregoing references is incorporated herein by reference in its entirety), the hybrid learning methodologies of the current patent document achieve significant performance gain. Compared with twelve state-of-the-art algorithms in Ref. 1 on the Caltech dataset, the approaches presented herein achieve the highest detection rate, outperforming the algorithms in False Positive Per Image (FPPI). Additionally, in embodiments, without the need of tuning parameters, the systems and methods presented herein automatically generate optimal clusters (verified by brute force enumeration) and local classifiers for different scenarios. And, embodiments of the present invention can be easily extended to different object detection tasks.

It shall be recognized that embodiments of the present invention provide at least three advantages over prior approaches: 1) the hybrid learning approach enables application of local learning in large-scale tasks; 2) the hybrid learning approach can automatically adjust the model complexity according to the distribution of the training data; 3) the approach of local adaptation from global classifier avoids the common under-training problem for local classifier—the approach presented herein gains significant performance enhancement in object detection over traditional algorithms, with very little increment in computational cost.

The remainder of this patent document is organized as follows. Section 2 describes embodiments of the global classification process for dividing the candidates into easy and ambiguous cases. Section 3 details embodiments of the clustering methodologies for balancing model complexity and learning capacity. Section 4 presents embodiments of local adaptation methodologies to further enhance learning capacity. Section 5 presents experimental results and summary. Section 6 presents embodiments of computing systems or devices.

2. Divide by Global Classification

As discussed above with respect to FIG. 1, embodiments of the present invention commence with a global classifier learned using all of the training data. The learned global classifier then partitions the input space into easy regions and hard regions. The easy region or regions comprise input data that is clearly negative or positive. The hard region or regions represent ambiguous data.

Since one role of the global classifier is as a filter to select hard regions for local learning/adaptation, in embodiments, the global classifier is preferred to be efficient and highly generalizable with a satisfactory performance. Linear SVM meets these requirements; however, one skilled in the art shall recognize that various general global learning algorithms (i.e. boosting-tree, latent-SVM, cascade-SVM, etc.) may be used. In embodiments, to locate the hard regions of ambiguous data, an upper bound $\Theta_1$ and lower bound $\Theta_2$ based on the classification scores of the global classifier may be used. In embodiments, the data bounded inside are ambiguous data, which can benefit from local learning.

Figure 2:
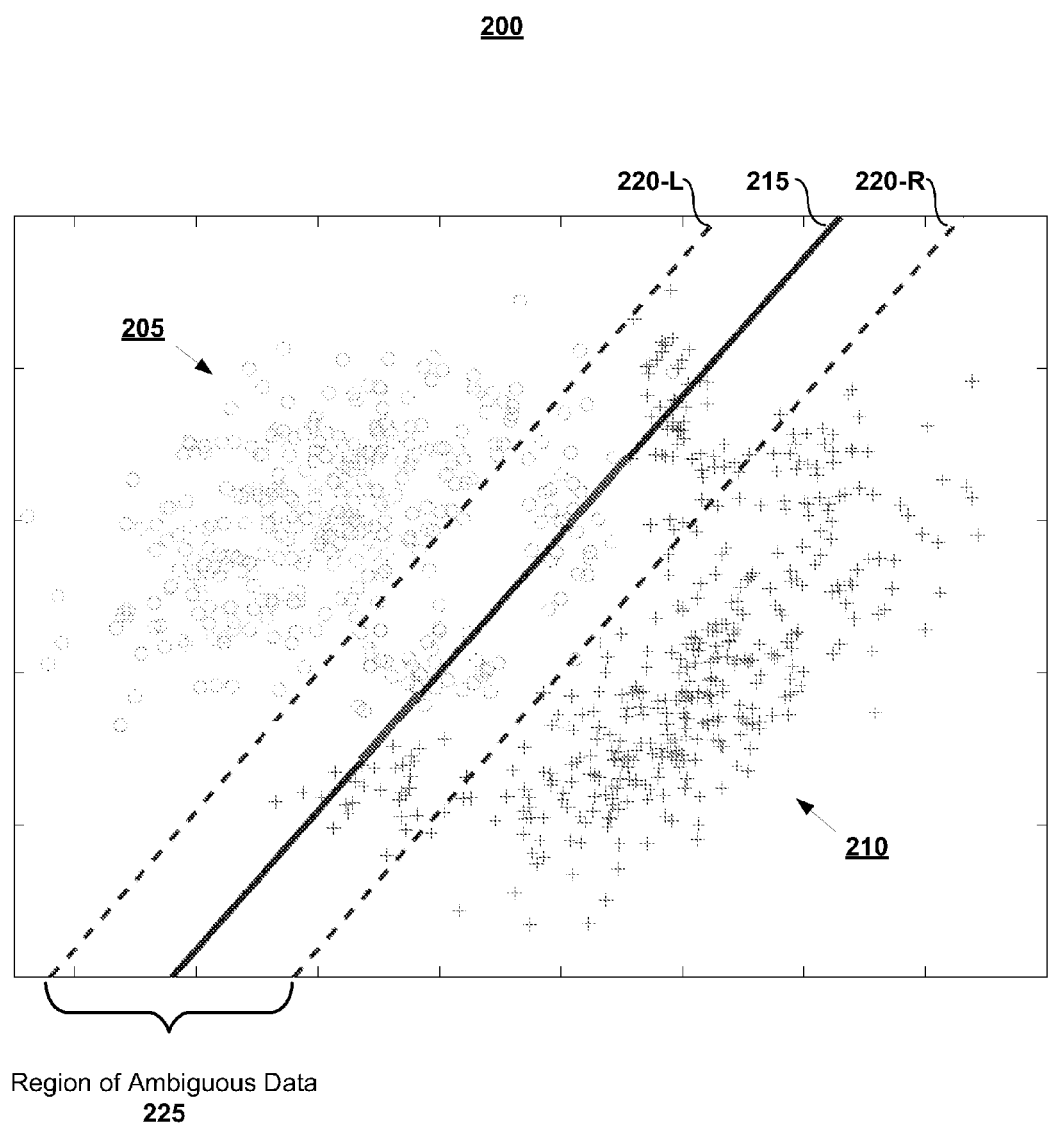
FIG. 2 depicts an example of input data in which ambiguous data has been identified according to embodiments of the present invention.

FIG. 2 depicts an example of input data in which ambiguous data has been identified according to embodiments of the present invention. The input data in FIG. 2 comprises two classes of data denoted as "O" and "+". A global classifier is depicted as line 215, and the global classifier boundaries are depicted as dotted lines 220-R and 220-L. In embodiments, the global classifier boundaries 220-R and 220-L may represent a +/− range around the global classifier, although it shall be noted that the range need not be symmetric about the global classifier nor need it be a fixed value or values. As shown in FIG. 2, the classifier boundaries 220-R and 220-L divide the data space 200 into easy regions (205 and 210) and hard regions (225). In embodiments, only the ambiguous data in hard regions (e.g., region 225) will be passed into the next stage and handled by more discriminative local classifiers.

3. Clustering

Adjusting Model Complexity

After filtering by the global classification, the remaining data (i.e., the ambiguous data) are processed using automatic clustering methodology. Such an approach provides an efficient and effective way to probe the local data distribution. Benefits of embodiments of the present invention are that the number of clusters and the population of each cluster are automatically adjusted. In embodiments, when further combined with a follow-up local adaptation, the methodology also strikes a balance between model complexity and learning capacity. In embodiments, a tailored spectral clustering algorithm (inspired by Perona, P., Polito, M., "Grouping and Dimensionality Reduction by Locally Linear Embedding," in Neural Information Processing Systems (NIPS) (2001) (hereinafter, "Ref 3") and Ng, A., Jordan, M., & Weiss, Y., "On spectral clustering: Analysis and an algorithm," in Advances in Neural Information Processing Systems (2001) (hereinafter, "Ref 4"), each of which is incorporated by reference herein in its entirety) is used to automatically divide the ambiguous data into local regions in the feature space. This essentially adjusts the model complexity autonomously according to the data distribution.

A. Distance Metrics

In embodiments, to effectively cluster the ambiguous data, a distance metric defining distance between a pair of samples in the feature space is selected. Different distance metrics may lead to different clustering on the data. For popular shape descriptors and texture descriptors, presented below are several frequently used distance measures.

Crude Distance.

Several simple and yet good measures are frequently used for computing distance in feature space, such as $L_1$-sqrt distance, $L_\infty$-Norm distance, and Euclidean distance. These crude distance measures have been widely adopted as meaningful solutions to distance computation.

Accurate Distance.

Alternatively, more costly "accurate" distance measures were developed. Some have proposed shape context distance that matches the point sets of two shapes and scores how different the shapes are. Others have proposed $\chi^2$ distance that maps the texture of each example to a histogram of "textons," then defined distance as the Pearson's $\chi^2$ test statistics between the two histograms. Adapted from the prior-mentioned approach, marginal distance sums up the distances between response histograms to measure the texture distance.

It shall be noted that all of these metrics may be used for clustering. In experiments presented herein, crude distance was used which already yielded reasonable results with low computational complexity. In embodiments presented herein, the Euclidean distance was adopted, although as previously noted other distance metrics may be employed. In embodiments, for each sample, the features are normalized according to their $L_2$ norm, and then the Euclidean distances with others are computed. In embodiments, the normalization is important for finding and setting proper clustering parameters.

B. Clustering

Many clustering algorithms may be adopted for clustering the ambiguous data. One straightforward method is k-means with a given number of clusters k. However, inappropriate k may drastically deteriorate the performance of the system. If k is too small, certain local clusters may contain too many samples resulting in over-fitting. If k is too big, most local clusters may be sparsely populated and inevitably suffer from under-training. Thus, care must be taken to choose an appropriate k, which is usually unknown beforehand. To find the appropriate value of k, one may need to exhaustively search all possible k and check the associated performance, which demands formidable computations.

To solve this problem, embodiments of the present invention adopt spectral clustering as discussed in Ref. 4 to effectively find appropriate value of k. Similar to the approaches in Ref. 3 and Ref. 4, the methodology involves searching for certain drop in the magnitude of the eigenvalues to decide the number of clusters. An embodiment of the clustering algorithm is summarized below in Algorithm 1:

---

Algorithm 1: Spectral Clustering with Eigen-Selection

Input: ambiguous data points $\{x_i | x_i \in \mathbb{R}^d\}_{i=1}^n$;
eigen-selection parameters $\alpha, \beta$ ($0 < \alpha, \beta < 1$).
Output: k partitions of the input data.

1. Form the affinity matrix A with elements:

$$a_{ij} = \exp\left(-\frac{\|Dis(x_i, x_j)\|^2}{2\sigma_{ij}^2}\right), i, j = 1, \ldots, n$$

2. Compute diagonal matrix D with elements $d_i = \Sigma_{j=1}^n a_{ij}$;

3. Compute Normalized Laplacian matrix L:

$$L = D^{-\frac{1}{2}} \cdot (D - A) \cdot D^{-\frac{1}{2}}$$

4. Compute eigenvalues of L and sort in descending order:
   $\lambda_i \geq \lambda_{i+1}, i = 1, 2, \ldots, n-1$
5. Get k by eigenvalue selection:

for $i = 2 \to n$ do
   $\quad$ if $\lambda_i \leq \alpha \cdot \lambda_{i-1}$ or $\lambda_i \leq \beta$ then
   $\quad\quad$ break;

k = i - 1;
6. Form normalized matrix S using k largest eigenvectors;
7. Treating each row of S as a data point, cluster all the data points by k-means;
8. Assign original data $x_i$ to cluster j only if row i of matrix S was assigned to cluster j;

---

In Algorithm 1, parameters $\alpha$ and $\beta$ define the criteria for selecting number of clusters, and $Dis(x_i, x_j)$ is the distance between samples $x_i$ and $x_j$. The scaling parameter $\sigma_{ij}$ is a measure to decide whether two samples are similar, which can be specified by self-tuning:

$$\sigma_{ij} = \sqrt{\sigma_i \cdot \sigma_j} \quad (1)$$

where, $$\sigma_i = Dis(x_i, x_{k_{th}}) \quad (2)$$

In Equation (2), $x_{k_{th}}$ represents the k'th nearest neighbor of point $x_i$. In the experiments discussed herein, the value k=7 was selected. Although Algorithm 1 produces high-quality clustering result, the computational complexity of $O(n^3)$ limits its application to large-scale data. Note that usually the number of ambiguous data is huge, so a fast approximation of spectral clustering preferably may be applied, such as k-means-based approximate spectral clustering (KASP), which is explained in step 3-6 of Algorithm 2 (below). However, it shall be noted that a fast approximation method need not be employed.

C. Parameter Selection & Fast Approximation

In embodiments, the spectral clustering algorithm helps effectively avoid exhaustive search for optimal model complexity. To balance learning capacity, embodiments of the present invention include a newly developed methodology to automatically determine the parameters of spectral clustering, $\alpha$, and $\beta$. Embodiments of the methodology may also include determining the parameters based on the accuracy of corresponding locally learned classifiers. Embodiments of such methodologies are presented in FIG. 3 and in Algorithm 2 (below):

---
Algorithm 2: Accelerated Automatic Clustering.
---

Input: ambiguous data points $\{x_i | x_i \in \mathbb{R}^d\}_{i=1}^n$.
Output: same as Algorithm (1)
1. Randomly split $\{x_i\}_{i=1}^n$ into partitions $\{P_i\}_{i=1}^M$ for M-fold cross validation
   to find optimal parameters $\alpha$, $\beta$:

for m = 1 → M do

1) Define training set $P_{tr}$ and validation set $P_{va}$ $P_{tr} = \{x_i\}_{i=1}^n - P_m$, $P_{va} = P_m$;

2) Apply step. 1-4 of Algorithm (1) on $P_{tr}$ and get all eigenvalues $\{\lambda_i'\}_{i=1}^{n_1}$, where $n_1 = |P_{tr}|$;

3) Search candidate eigenvalue drops. Initialize T = 0:

for i = 2 → $n_1$ do if $\lambda_i' \leq 0.5 \cdot \lambda_{i-1}'$ then

T = T + 1;

$k_T' = i - 1$, $\alpha_T' = \lambda_{i-1}'/\lambda_i'$, $\beta_T' = \lambda_i'$;

4) Cluster and check performance for each candidate:

for t = 1 → T do

Apply step. 6-8 of Algorithm (1) with $k = k_t'$ on $P_{tr}$ to get clusters $C_t'$;

Learn local classifiers $F_t'$ on each cluster of $C_t'$;

Evaluate $F_t'$ on $P_{va}$ and compute error rate $\varepsilon_t'$;

5)    $\{\alpha_m, \beta_m, k_m, \varepsilon_m\} = \underset{\{\alpha_t', \beta_t', k_t', \varepsilon_t'\}}{\operatorname{argmin}} \{\varepsilon_t'\}_{t=1}^T$

---

Figure 3:
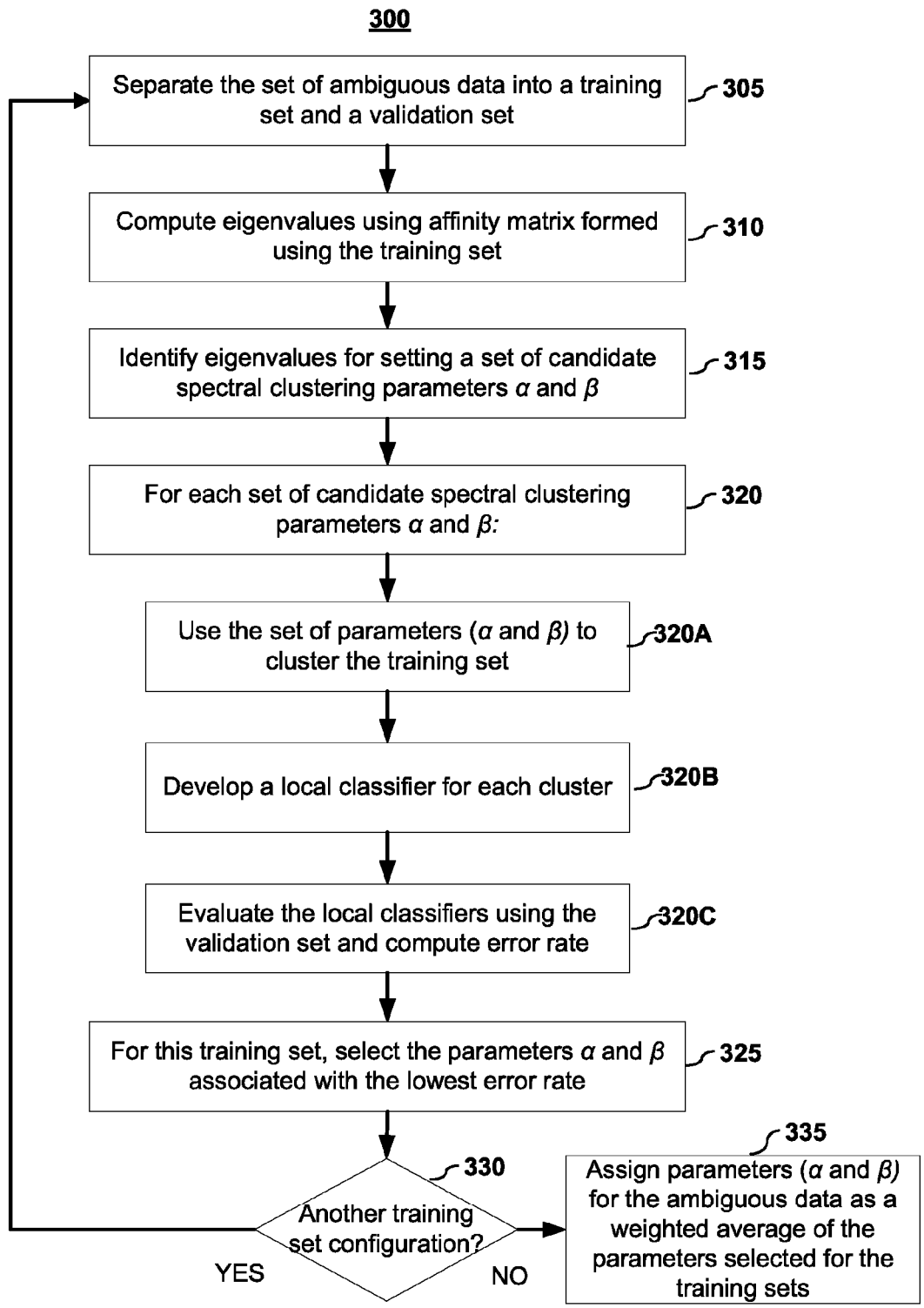
FIG. 3 depicts a method for determining parameters of spectral clustering according to embodiments of the present invention.

FIG. 3 commences by separating (305) the set of ambiguous data into a training set and a validation set. This step can be seen in the embodiment in Algorithm 2 at step 1, in which the ambiguous training data is randomly partitioned into M subsets (typically M=10 but other values may be used) for cross validation to find the optimal parameters. In embodiments, for each fold, the eigenvalues are computed (310) and sorted in descending order using affinity matrix formed from the training set as in step 1.2) in Algorithm 2. Eigenvalues for setting a set of candidate spectral clustering parameters $\alpha$ and $\beta$ may then be identified (315). In embodiments, the eigenvalues may be identified by searching for drops between consecutive eigenvalues $\lambda_{i-1}$, $\lambda_i$ where $\lambda_i \leq 0.5 \lambda_{i-1}$ (see Algorithm 2, Step 1.3)). Note that this indicated a 50% drop between consecutive eigenvalues; however, other values may be used. For each of such candidate drops, spectral clustering algorithm with parameters $\alpha = \lambda_{i-1}/\lambda_i$, $\beta = \lambda_i$ is applied to construct clusters.

In embodiments, for each set of candidate spectral clustering parameters, the parameters are used (320A) to cluster the training set; local classifiers are developed (320B) for the clusters, and the local classifiers are evaluated (320C). It should be noted that local learning need not be applied when developing the local classifiers; however, Algorithm 2 depicts an embodiment that uses local learning. In the embodiment depicted in Algorithm 2, each cluster is applied with local learning algorithm and an overall error rate $\varepsilon$ over all clusters is computed. In embodiments, the local learning as described in Section 4 may be used. Then, among the error rates for all the candidate drops, the smallest one is found and the corresponding parameters $\alpha_m$ and $\beta_m$ are selected (325) as the optimal parameters for the m-th fold.

In embodiments, the process is repeated (330) for different training set configurations. If there are no more training sets, the parameters ($\alpha$ and $\beta$) for the ambiguous data may be assigned (335) as an average (e.g., mean, median, mode) of the parameters selected for the training sets. For example, in embodiments, the average may be a weighted average $\alpha$, $\beta$ from $\alpha_m$, $\beta_m$ (m=1, . . . , M) as the parameters for the whole dataset, where the weights are computed by normalizing $1-\varepsilon_m$, the overall accuracy for the m-th fold.

Given the clustering parameters $\alpha$ and $\beta$, in embodiments, Algorithm 1 may be used to do clustering. As explained above in Section 3.A., when the data set is large, directly applying Algorithm 1 may be computationally prohibitive. Thus, in alternative embodiments, a fast approximation, such as KASP, may be used to speed up this process, as shown in steps 3-6 of Algorithm 2. Specifically, for a desired number of clusters k, a larger number $k_0$ approximately 20 times bigger than k is defined, as shown in step 1-3 of Algorithm 2. It shall be noted $k_0$ may be set at other sizes that may be user selected or determined empirically. Having defined $k_0$, the $k_0$-means is applied and the centroid $\{y_j\}_{j=1}^{k_0}$ of each cluster is computed. Algorithm 1 then operates on $\{y_j\}_{j=1}^{k_0}$. The cluster membership of each sample $x_i$ is recovered using a table of correspondences with $y_j$.

It shall be noted that the clustering algorithm with parameter selection and fast approximation is summarized in Algorithm 2. The methodology not only speeds up the original clustering method in Algorithm 1, but also simplifies the query. In embodiments, during a test or detection phase, for each sample, its nearest neighbor in the $k_0$ centers is computed, and then the correspondence table is used to find its cluster membership.

Figure 4:
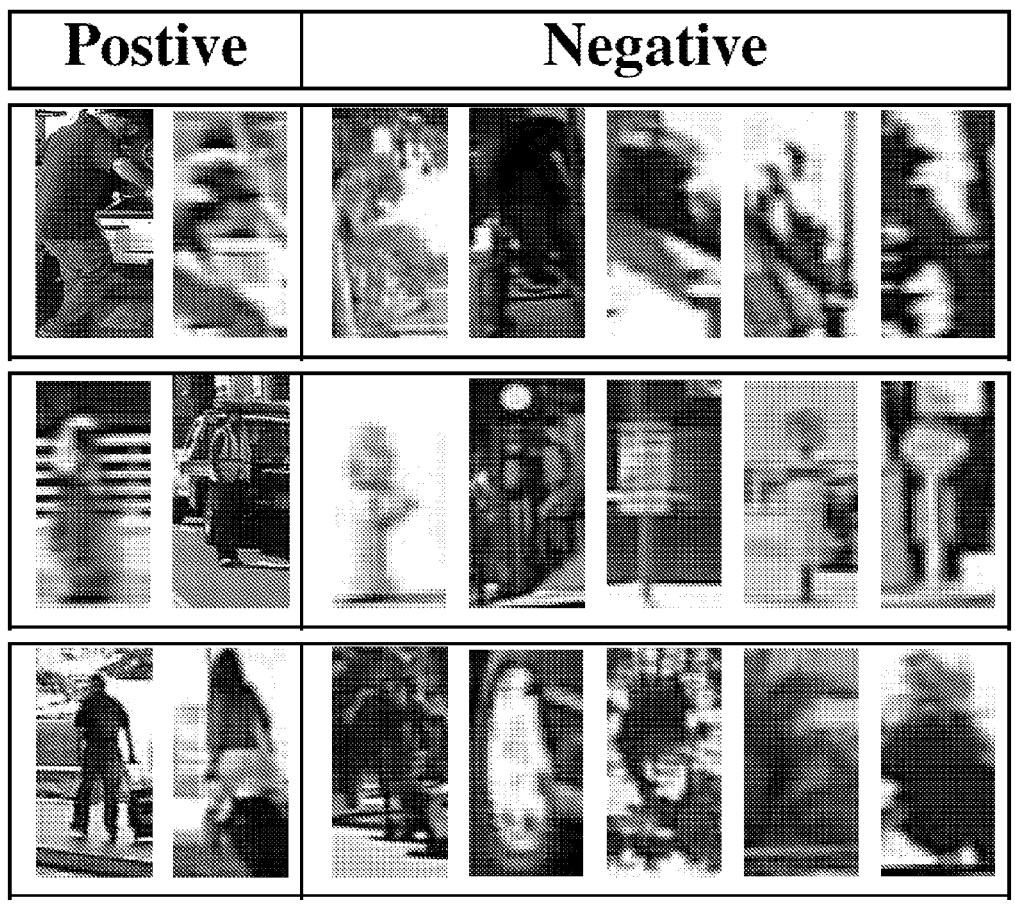
FIG. 4 depicts sample results of automatic clustering on ambiguous sample data according to embodiments of the present invention.

A sample of clustering results obtained using aspects of the present invention is shown in FIG. 4. In the sample results depicted in FIG. 4, different rows correspond to different clusters. As can be seen, the methodology works well—images from each row share similar shape, background, and appearance.

4. Local Adaptation

Enhancing Learning Capacity

According to embodiments of the present invention, after the ambiguous data has been appropriately clustered, local learning may be used to enhance the learning capacity. In embodiments, a straightforward local learning approach is to train a general classifier directly using the data from each local cluster. However, the direct learning has at least one disadvantage—it uses only limited samples in a local cluster and discards the information from the whole dataset that are usually beneficial. Hence, the performance of generated local classifier heavily relies on the population and data distribution of the cluster, and often suffers from under-training.

To address this issue, in embodiments, a model adaptation strategy is presented herein that leverages the global classifier for effective local learning. Though the global classifier $F_0$ trained in the first stage may not behave perfectly on each local cluster, it should be close to the optimum classification boundary. And most importantly, it contains non-negligible information about global data distribution. Therefore, in embodiments, the local learning problem is treated as utilizing a coarse global classifier $F_0$ to adapt into different fine local classifiers. This effectively enhances the learning capacity of the methodology presented herein in each local cluster.

FIG. 5 depicts a general overview of the local learning adaptation according to embodiments of the present invention. Having obtained (505) a global classifier and a set of clusters of ambiguous data, the set of clusters can be used to adapt the global classifier. In embodiments, each cluster is used to modify (510) the global classifier based upon the data in the cluster. The output classifiers therefore reflect input from the global classifier with refinement based upon local data sets.

In embodiments, a Min-Max model adaptation is adopted, such as the one discussed in Chen, G., Han, T. X., Lao, S., "Adapting an object detector by considering the worst case: A conservative approach," in Computer Vision and Pattern Recognition (CVPR), pp. 1369-1376 (2011) (hereinafter, "Ref. 5"), which is incorporated by reference herein in its entirety. Compared with other state-of-the-art adaptation methods, the Min-Max is free of tuning parameters (e.g., the adaptation rate) and able to adapt from general parametric classifier. Thus, the global classifier $F_0$ may be trained by various methods (such as, Hedi Harzallah, Frédéric Jurie, and Cordelia Schmid, "Combining efficient object localization and image classification," in IEEE International Conference on Computer Vision (ICCV) 2009: 237-244 (hereinafter, "Ref. 6"), or P. Felzenszwalb, D. McAllester, D. Ramanan, "A Discriminatively Trained, Multiscale, Deformable Part Model," in IEEE Conference on Computer Vision and Pattern Recognition (CVPR), 2008 (hereinafter, "Ref. 7") (each of the foregoing references is incorporated herein by reference in its entirety)). In embodiments presented herein, linear SVM was chosen due to its superior efficiency and satisfactory performance, although as noted above, other methods may be employed. A summary of an embodiment of the local adaptation approach in presented in Algorithm 3 (below):

---

Algorithm 3: Local Learning by Min-Max Adaptation

Input: Pre-learnt global classifier $F_0$ with parameters $w_0$; K clusters $\{S_k\}_{k=1}^{K}$ obtained using Algorithm (2); Min-Max adaptation parameters.
Output: Adapted local classifiers $\{F_k'\}_{k=1}^{K}$ for k = 1 → K do 1. Form N data covers $\{G_j\}_{j=1}^{N}$ from data in $S_k$;

2. Build the cost functions $\{C_j\}_{j=1}^{N}$ based on logistic regression;

3. Define cost function E(w) on $S_k$:
   E(w) = ($\max_j [C_j(w)]$)

4. Approximate E(w) as ∞-Norm:

$E(w) = \|C(w)\|_\infty \approx \left(\sum_{j=1}^{N} [C_j(w)]^q\right)^{\frac{1}{q}}$ 5. Set $w^{[0]} = w_0$, T = ∞, i = 0;
   while T >= $\xi$ do compute the gradient and Hessian matrix $\nabla E(w^{[i]})$, $H_E(w^{[i]})$, and update w:

$w^{[i+1]} = w^{[i]} - H_E^{-1}(w^{[i]}) \cdot \nabla E(w^{[i]})$;

$T = \sqrt{\nabla E(w^{[i]})^T \cdot H_E^{-1}(w^{[i]}) \cdot \nabla E(w^{[i]})}$ ;

i = i + 1;

6. Set parameter for classifier $F_k'$: $w_k' = w^{[i]}$;

---

Figure 6:
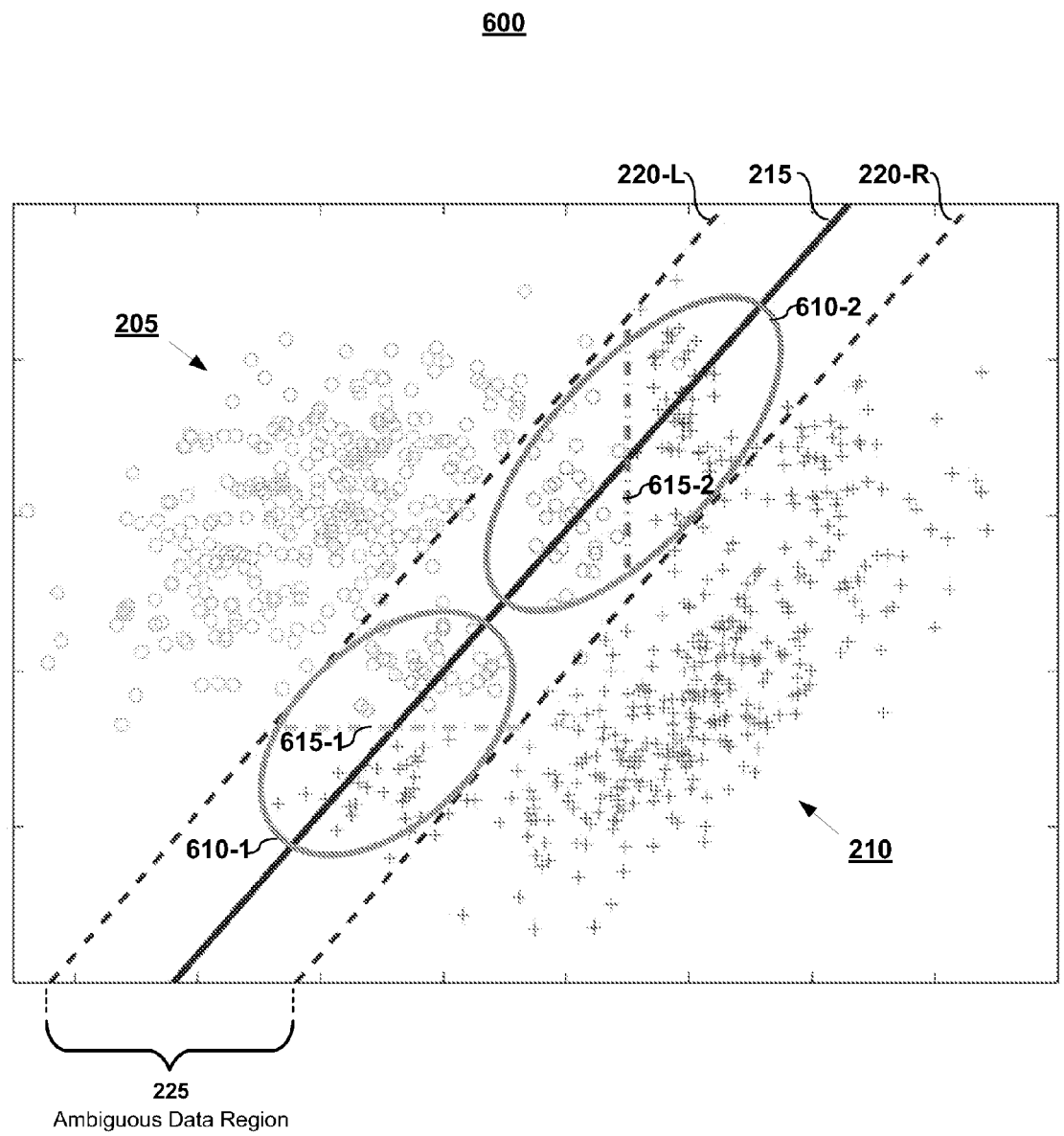
FIG. 6 depicts the sample data of FIG. 2 with examples of clusters of ambiguous data and local adaptation according to embodiments of the present invention.

FIG. 6 depicts the sample data of FIG. 2 with examples of clusters of ambiguous data and local adaptation according to embodiments of the present invention. Recall that FIG. 2 depicts example input data (which comprises two classes of data denoted as "O" and "+") in which ambiguous data has been identified according to embodiments of the present invention. The global classifier is depicted as line 215, the global classifier boundaries are depicted as dotted lines 220-R and 220-L, and the ambiguous data lies within the boundaries in region 225. The ambiguous data in hard regions (e.g., 225) was clustered according to the data distribution, which automatically adjusts the model complexity. Each cluster of samples (e.g., 610-1 and 610-2) was classified using locally adapted classifier (e.g., 615-1 and 615-2) that avoids under training. It shall be noted that this hybrid learning algorithm autonomously strikes a balance between model complexity and learning capacity.

Figure 7:
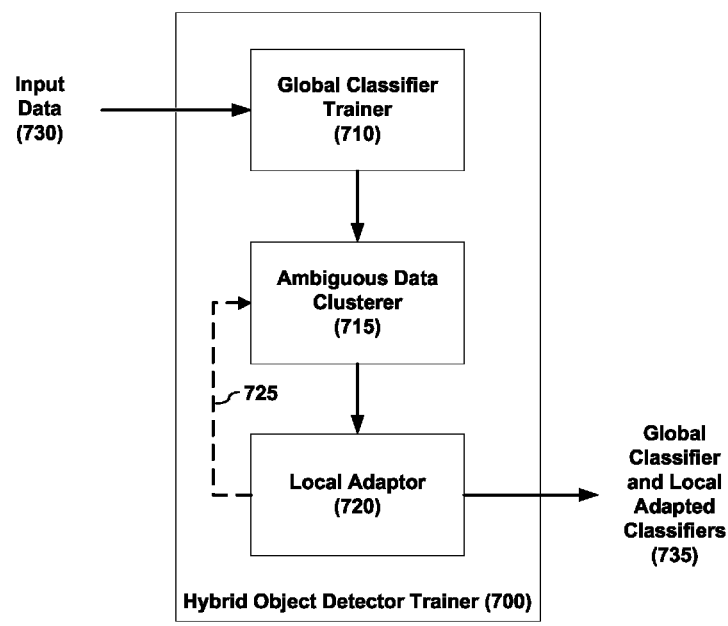
FIG. 7 depicts an embodiment of a hybrid object detector trainer system according to embodiments of the present invention.

FIG. 7 depicts an embodiment of a hybrid object detector trainer system 700 according to embodiments of the present invention. In the depicted embodiment, the system 700 comprises a global classifier trainer 710, an ambiguous data cluster 715, and a local adaptor 720.

In embodiments, the system 700 receives input training data 730 that comprises features and known object labels. Global classifier trainer 710 receives the input data and uses it to generate a global classifier. Global classifier trainer 710, ambiguous data clusterer 715, or both uses the trained global classifier to identify ambiguous data. In embodiments, the ambiguous data is received by the ambiguous data clusterer 715, which attempts to properly cluster the data. In embodiments, the ambiguous data clusterer 715 may implement Algorithm 2 to cluster the data. In embodiments, the ambiguous data clusterer 715 obtains a set of spectral clustering parameters for the set of ambiguous data based, at least in part, on detection accuracy of local adaptation to the global classifier. Thus, in embodiments, the ambiguous data clusterer 715 may submit interim or candidate clusters (see, e.g., Algorithm 2, step 1.4)) to the local adaptor 720 for local adaption, which is returned (725) to the ambiguous data clusterer 715. In embodiments, once the final set of spectral clustering parameters has been determined and the data clustered, the local adaptor 720 adapts the global classifier based upon the clusters of ambiguous data using, for example, Algorithm 3. In embodiments, the system 700 outputs a global classifier and local adapted classifiers 735, which may be used in detecting.

Figure 8:
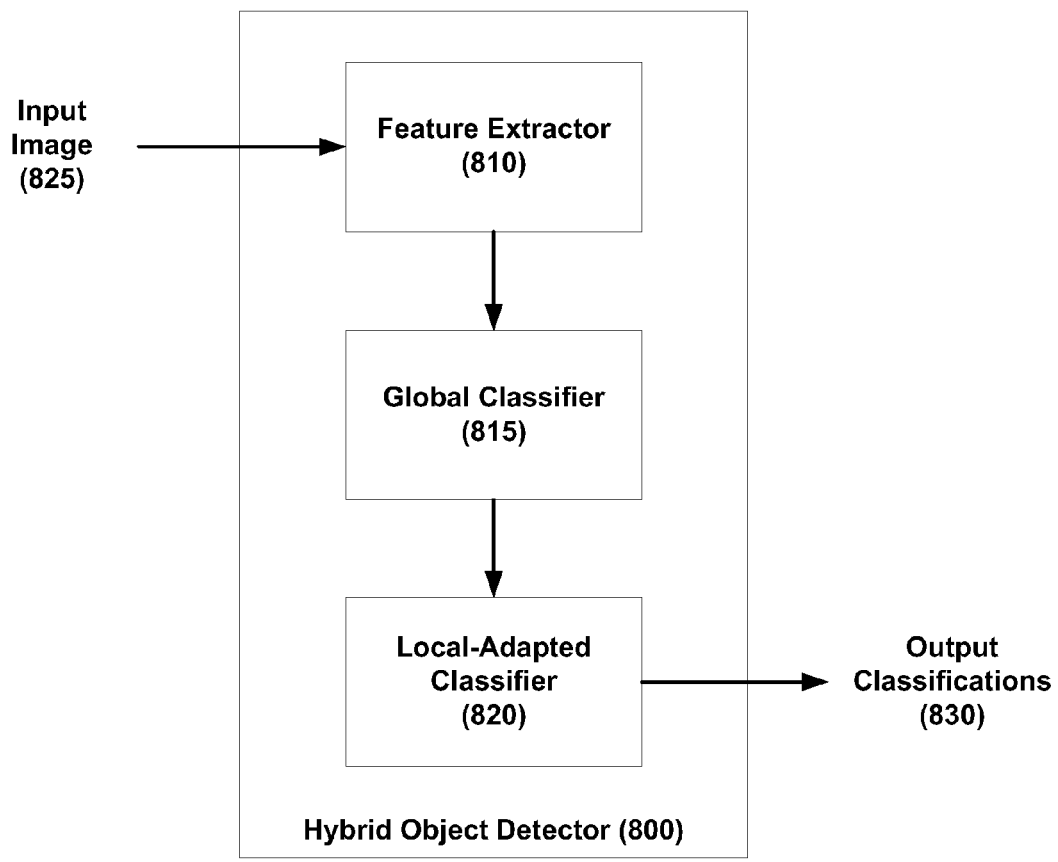
FIG. 8 depicts a system that may use a global classifier and local adapted classifiers to detect one or more objects in an image (still image or video image) or images according to embodiments of the present invention.

FIG. 8 depicts a system that may use a global classifier and local adapted classifiers to detect one or more objects in an image (still image or video image) or images according to embodiments of the present invention. FIG. 9 depicts a method for detecting one or more objects in an image or images that may be executed by the system of FIG. 8 according to embodiments of the present invention.

As shown in FIG. 8, embodiments of the detection system 800 may comprise a feature extractor 810, a global classifier 815, and a local-adapted classifier 820. In embodiments, an input image or images (which may be still images or images from a video) 825 are received by the feature extractor 810 to obtain image features (or image patches). In alternative embodiments, the feature (or image patch) extraction may be performed separately and the features submitted to the system for detection. Using a pre-learned/pre-trained global classifier, a response value is obtained (905) for each feature (or image patch). In embodiments, the responses are classified (910) into one of three groups: positive, negative, or ambiguous. The image patches associated with the clearly positive response values will be deemed to contain the object of interest. Likewise, the image patches associated with the clearly negative response values will be deemed not to contain the object of interest. For each image patch that was identified as ambiguous, the closest ambiguous data cluster is identified and its classifier is used to obtain (915) a response value. In embodiments, the closest ambiguous data cluster may be identified by finding the ambiguous data cluster that has an average (mean, median, or mode) value that has the smallest distance to the feature of the ambiguous image patch. If the response value using that ambiguous data cluster's classifier is in a positive range, the image patch will be deemed to contain the object of interest; otherwise, it will be deemed not to contain the object of interest. In embodiments, if the value falls in yet another ambiguous range, the image patch may be further processed to help ascertain whether the image patch contains the object of interest. For example, in embodiments, the methodology of the present invention may be applied recursively, at multiple levels, or in a cascaded fashion.

Sample results of the detection process are provided in the next section.

5. Experiments and Results

Results are presented herein to demonstrate possession of the inventive aspects presented in the current patent document and to demonstrate its improved results over prior methods. These results were performed using specific embodiments and under specific conditions; accordingly, nothing in these results sections shall be used to limit the inventions of the present patent document. Rather, the inventions of the present patent document shall embrace all alternatives, modifications, applications and variations as may fall within the spirit and scope of the disclosure.

Embodiments of the methodologies were tested on pedestrian detection, which is important and yet challenging in practice. Extensive experiments have been performed on several most popular datasets. Embodiments of the present invention were compared with state of the art single layer (non-cascaded) detectors. The result demonstrated that the present invention greatly improves the detection rates. Embodiments of the present invention were also compared with state of the art using the same evaluation methodology used in Ref. 1. The experiments presented herein show both qualitative and quantitative results on several challenging datasets to confirm the advantages of the present invention.

The rest of this section consists of five parts: the first one explains the experiment design and implementation details; the second part tests embodiments of the present invention on a large challenging pedestrian dataset "In-House" collected by the inventors; the third and fourth parts respectively evaluate embodiments of the present invention on two popular benchmarks: Caltech (Ref. 1) and INRIA (Ref. 2) datasets; and finally efficiency of embodiments of the present invention is discussed.

A. Experimental Setup

Parameter Setting.

Unlike most learning algorithms that require careful parameter tuning, embodiments of Algorithm 2 automatically finds the optimal parameters that yields the best performance. So, in embodiments of the present invention, only three (3) parameters need be specified. Two of them are used for local adaptation: the cover number N and $\infty$-Norm approximation parameter q in Algorithm 3. In embodiments, the default values as in Ref. 5 are adopted. In embodiments, the last parameter is used to find drops in consecutive eigenvalues for spectral clustering in Algorithm 2, and is set as 0.5, as explained in Sec. 3.C. (above). In embodiments, all other parameters are automatically decided by Algorithm 2.

Feature Descriptors.

Among a wide range of different choices of descriptors, it is commonly believed that Histogram of Gradients (HOG) is one of the best features to capture the edge or local shape information and the Local Binary Patters (LBP) is an exceptional texture descriptor. Therefore, both shape (HOG) and texture (LBP) descriptors were tested with embodiments of the learning framework of the present invention. Only the HOG descriptor was used for In-House and Caltech datasets, and HOG together with LBP was used for the INRIA dataset.

Experiments Design.

The performance of an embodiment of the present invention was systematically evaluated and compared with most popular state-of-art methods. For a divide-and-conquer framework, the inventors first experimented with different number (k) of clusters using k-means, where each cluster is classified using linear SVM. Results showed that the overall detection accuracy can be improved by choosing appropriate value of k. The inventors then experimented with the optimal k computed using the present invention's automatic clustering Algorithm 2. Experimental results confirmed that the automatic algorithm yielded similar performance as the best achieved by enumerating various k and clustering using k-means. For the local adaptation approach, the inventors compared the performances' improvement gained (not only on detection rate but also on speed) by two different local learning methods: directly learning by linear SVM and local adaption with Min-Max. For the experiments above, the detection curves were plotted in terms of False Positives Per Window (FPPW) instead of False Positives Per Image (FPPI) to evaluate the performance of classifiers, since FPPW allows a better assessment of the learning algorithm and isolates the impact of post-processing such as non-maximal suppression. Finally, the inventors compared an embodiment of the present invention with the state of art. The results were plotted in FPPI curve for a whole evaluation of the embodiment. For fair comparison, the embodiment of the present invention and the most popular classification algorithms, including Latent-SVM (Ref. 7), Hik-SVM (S. Maji, A. C. Berg, and J. Malik, "Classification using intersection kernel support vector machines is efficient," in Computer Vision and Pattern Recognition (CVPR), 2008 (hereinafter, "Ref. 8"), which is incorporated by reference herein in its entirety), and Linear-SVM (Ref. 2) were experimented on the In-House and Caltech datasets using exactly identical experiment setup, e.g., features, training data, non-maximal suppression, etc. Additionally, the inventors compared an embodiment of the present invention against twelve state-of-the-art algorithms as discussed in Ref. 1 on the Caltech dataset. The results confirmed that the approach of the present invention achieves great performance improvement over the best of the state-of-art. To make the comparison more convincing, the inventors not only compared the miss rates at 1 FPPI, but also calculated the Log-average miss rates as in Ref. 1 for the compared methods.

B. In-House Dataset

The In-House dataset was collected and labeled by the inventors, containing 5691 images with fixed resolution at 320×240. Performing detection on this dataset was challenging due to the fact that many of the pedestrians are small, partly occluded, and hardly identifiable from background even by human eyes. The inventors randomly divide the dataset into three (3) partitions for three-fold cross-validation.

Figure 10A:
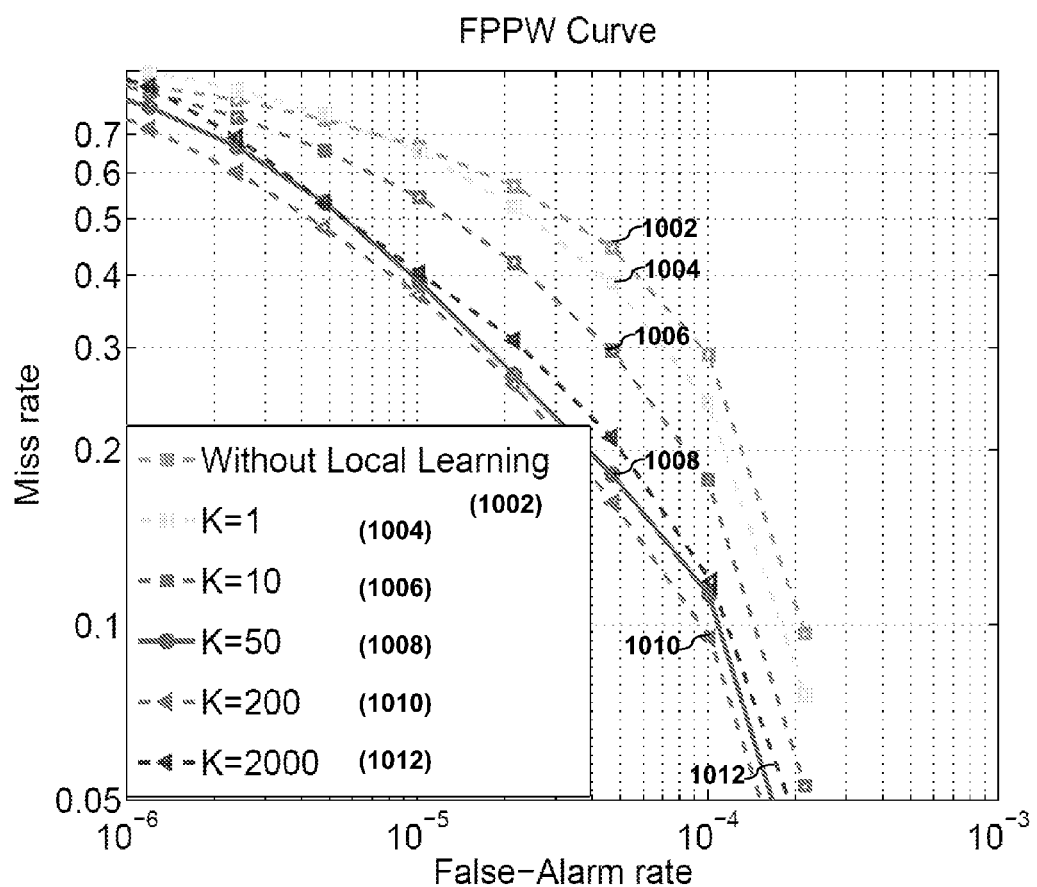
FIGS. 10A-C depict evaluation results of an embodiment of the present invention relative to other methodologies using an In-House dataset. All results are plotted as miss-rate with respect to false-alarm-rate in False Positive Per Window (FPPW).

First, the inventors directly apply k-means clustering followed by local learning using linear SVM with k varying from 1 to 2000. The results with different k are shown in FIG. 10A. It should be noted that k=1 means considering all ambiguous data as a single cluster and training for one classifier, similar to a re-training on the whole dataset. As can be seen, the overall performance for all k>1 cases are greatly improved over the case of k=1. Compared with the traditional approach without local adaptation, the miss rate at k=50 is significantly reduced by 25% at $10^{-5}$ and 16% at $10^{-4}$ False-Alarm rate in FPPW. Furthermore, when 1<k<200 the performance improves exponentially as k increases. However, when k>200 the performance starts to drop. For example when k=2000, the accuracy drops 7%-15% at $10^{-5}$, $10^{-4}$ FPPW than that of k=50.

In a divide-and-conquer approach, k determines the complexity of the learned model. The results above show the overall performance is highly dependent on k. This confirms that it is critical to balance the model complexity and learning capacity. When k=1, the learned model is over-simplified and a single classifier is not capable of learning the complex boundary between positive and negative samples. When k increases from 1, the learned models tend to be more complex. Before over-fitting occurs, classification accuracy may be improved due to the reduction of learning bias. However, when k is too big (e.g., k=2000), i.e., the model complexity is too high, the large learning variance would lead to over-fitting. One typical phenomenon is that individual clusters may contain under-populated training samples, which results in under-training. Therefore, embodiments of the present invention seek for such an optimal value of k that yields the best overall performance.

Figure 10B:
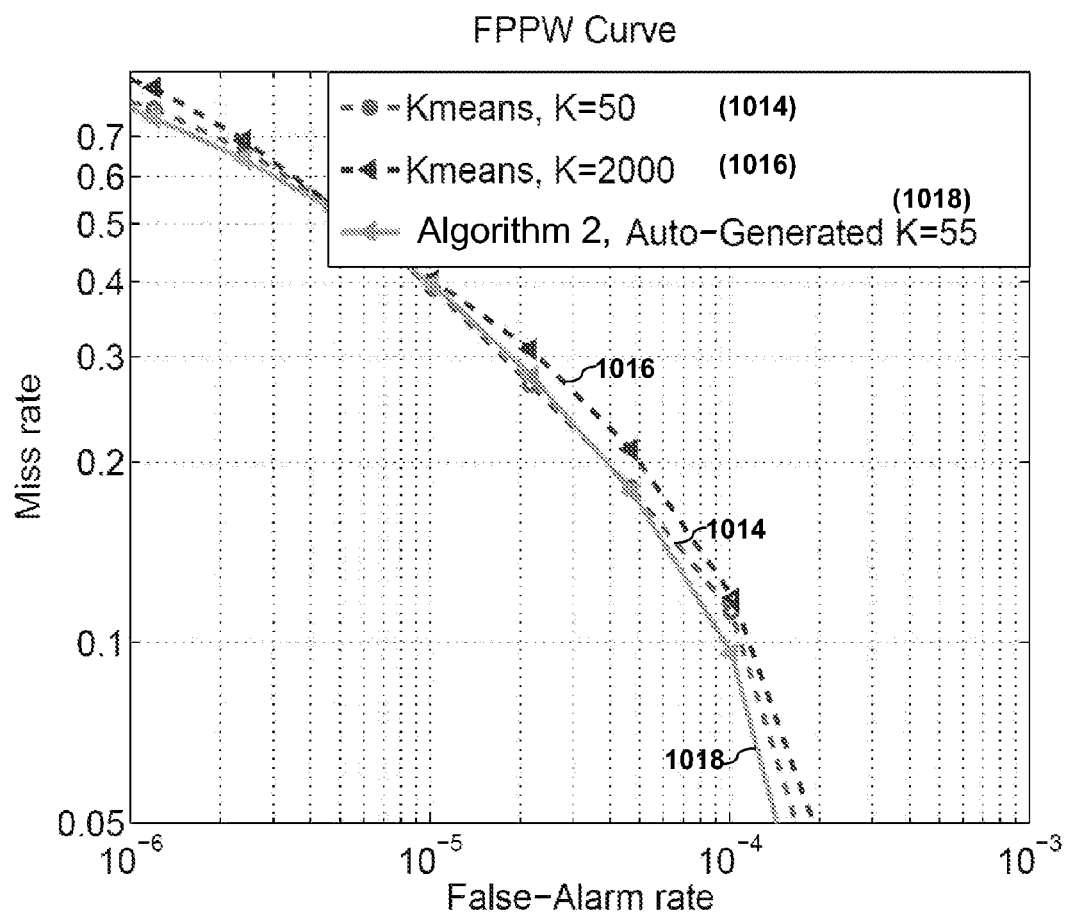

Second, the inventors evaluated an embodiment of the present invention's local learning algorithm with the automatic clustering Algorithm 2 and compared with the best results in the first experiment. The number of clusters computed by Algorithm 2 was 55. The inventors then performed local learning with linear SVM on individual clusters. As shown in FIG. 10B, the tested embodiment of the present invention achieves the results as good as the best one in the first experiment. It confirms that the present invention autonomously strikes a good balance between model complexity and learning capacity.

Figure 10C:
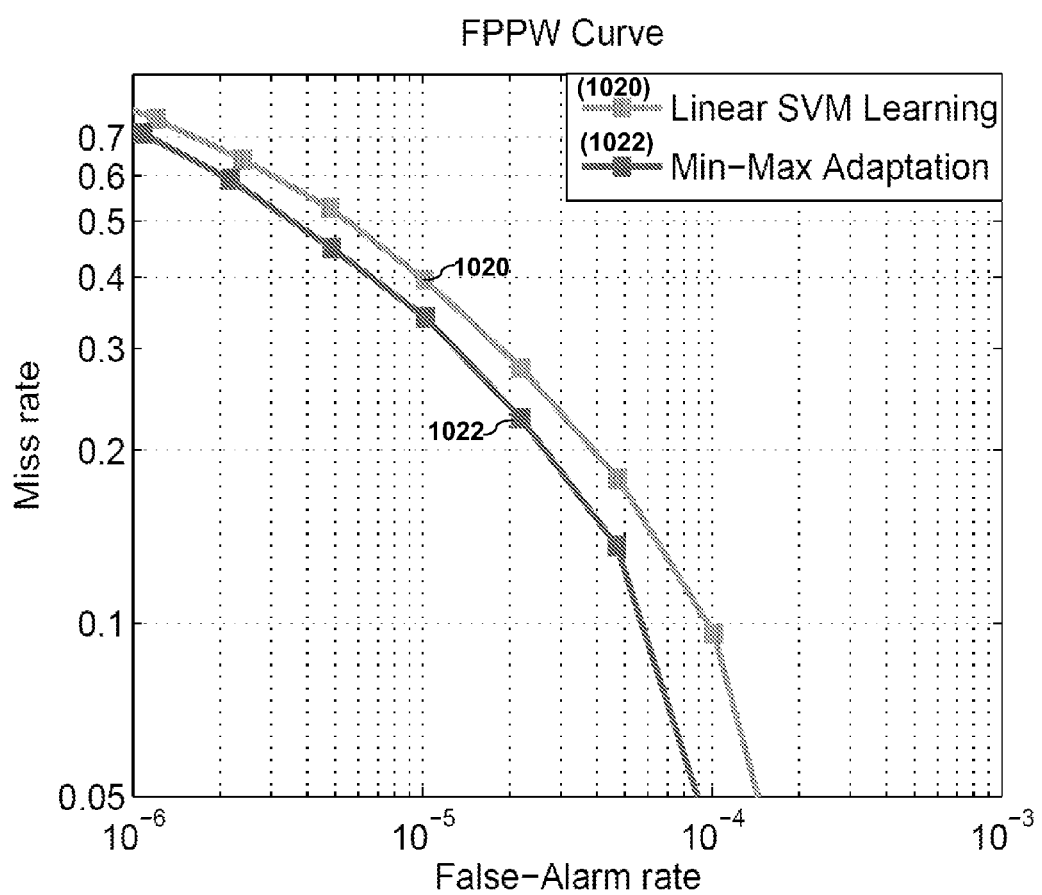

Then, the two local classification methods were compared using the clusters computed from Algorithm 2. The detection performance of the two types of local learning algorithms is shown in FIG. 10C. As can be seen, the Min-Max adaptation method performs better, further reducing the miss rate by 5% at $10^{-4}$ FPPW. Training the linear SVMs is much faster, 55 local classifiers taking only half an hour to train, while Min-Max adaptation takes 1 day. Overall, the proposed local adaptation algorithm achieves the best detection rates, reducing the miss rate by 30% at $10^{-5}$ and 21% at $10^{-4}$ FPPW compared with the single global classifier.

Figure 12A:
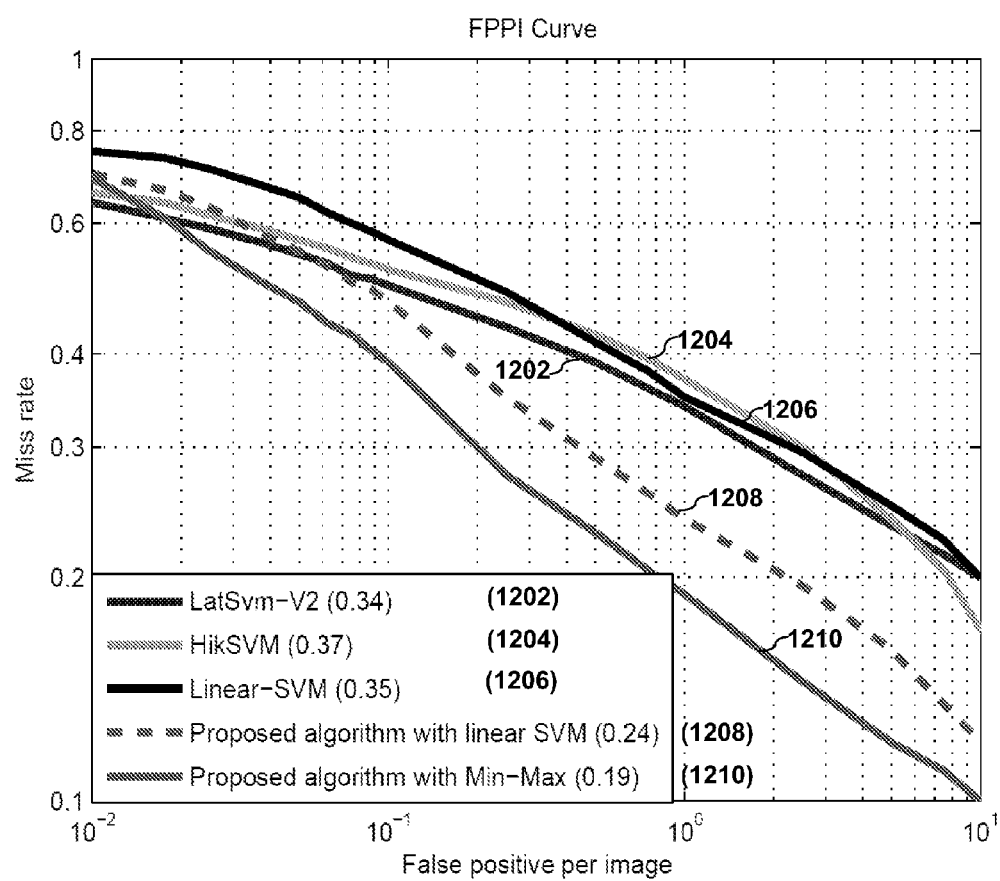
FIGS. 12A and 12B depict comparisons between an embodiment of the present invention with other most popular classification algorithms on the In-House dataset (FIG. 12A) and Caltech (FIG. 12B) training dataset—all algorithms used identical experimental settings. All figures are plotted as miss-rate with respect to Fall Positives Per Image (FPPI).

Finally, an embodiment of the present invention was compared with the most popular classification algorithms: Latent-SVM (Ref. 7), Hik-SVM (Ref. 8), and Linear-SVM (Ref. 2) on the In-House dataset using exactly the same experiment setup. From FIG. 12A, it can be seen that the present invention achieved the best results, outperforming the other approaches 15%, 18%, 16%, respectively at FPPI=1. Based on Log-average miss rate criterion, the present invention still achieved the lowest miss rate 38%, which is 17%, 19%, 21% better than the Latent-SVM, Hik-SVM, and Linear-SVM approaches, respectively.

C. Caltech Dataset

Caltech dataset is one of the most challenging pedestrian datasets, since pedestrians appear from multiple viewpoints and have a wide range of scales. Lots of cars and buildings make the background very cluttered. The labeled Caltech training dataset contains six sessions (S0-S5), each contains multiple videos taken from a moving vehicle. The inventors followed the exact same six-folder-cross-validation evaluation methodology as in Ref. 2 and only consider the "reasonable" pedestrians.

Figure 11A:
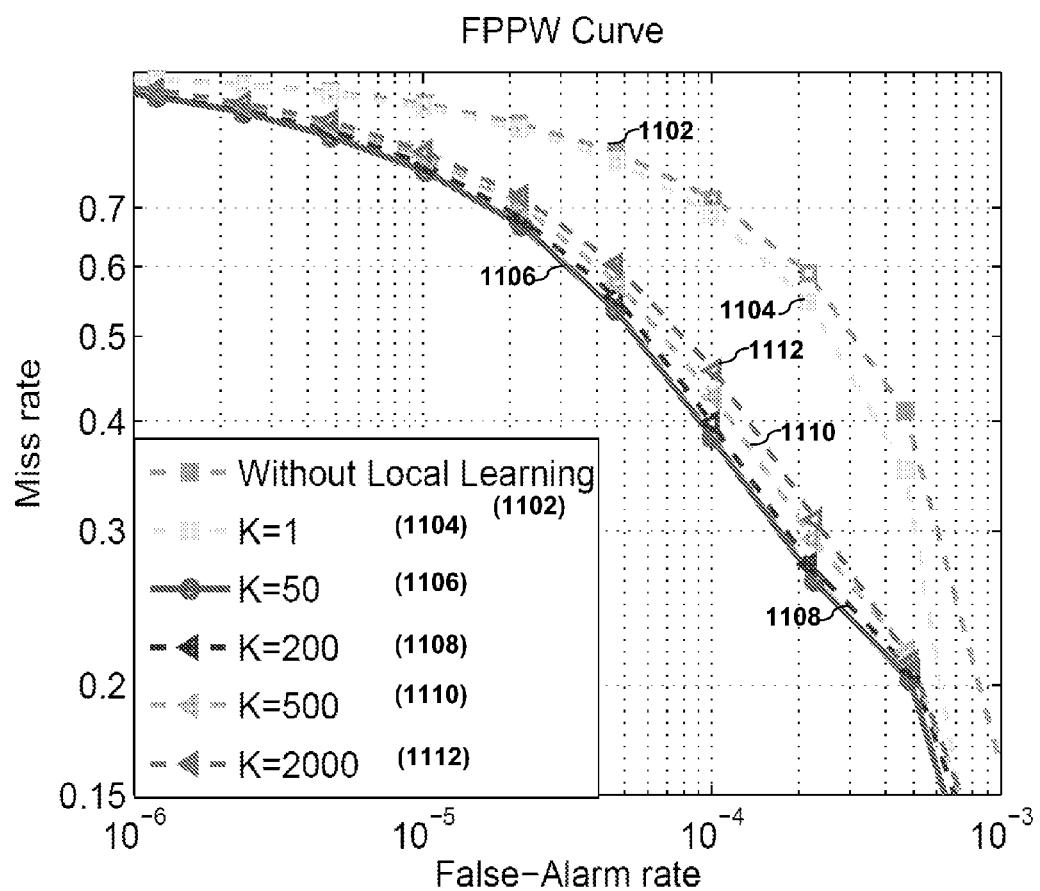
FIGS. 11A-C depicts evaluation results of an embodiment of the present invention relative to other methodologies using a Caltech dataset. All results are plotted as miss-rate with respect to false-alarm-rate in FPPW.
Figure 11B:
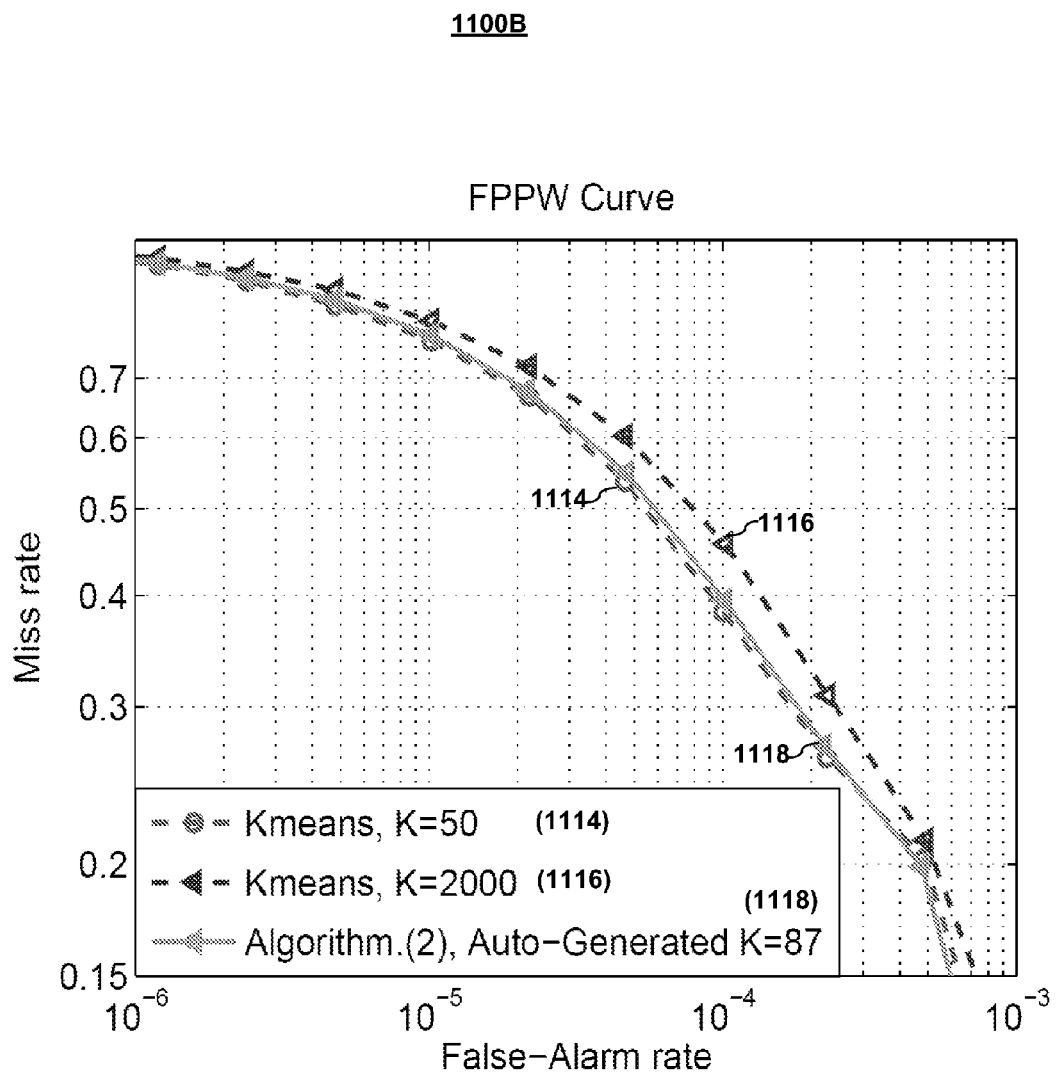
Figure 11C:
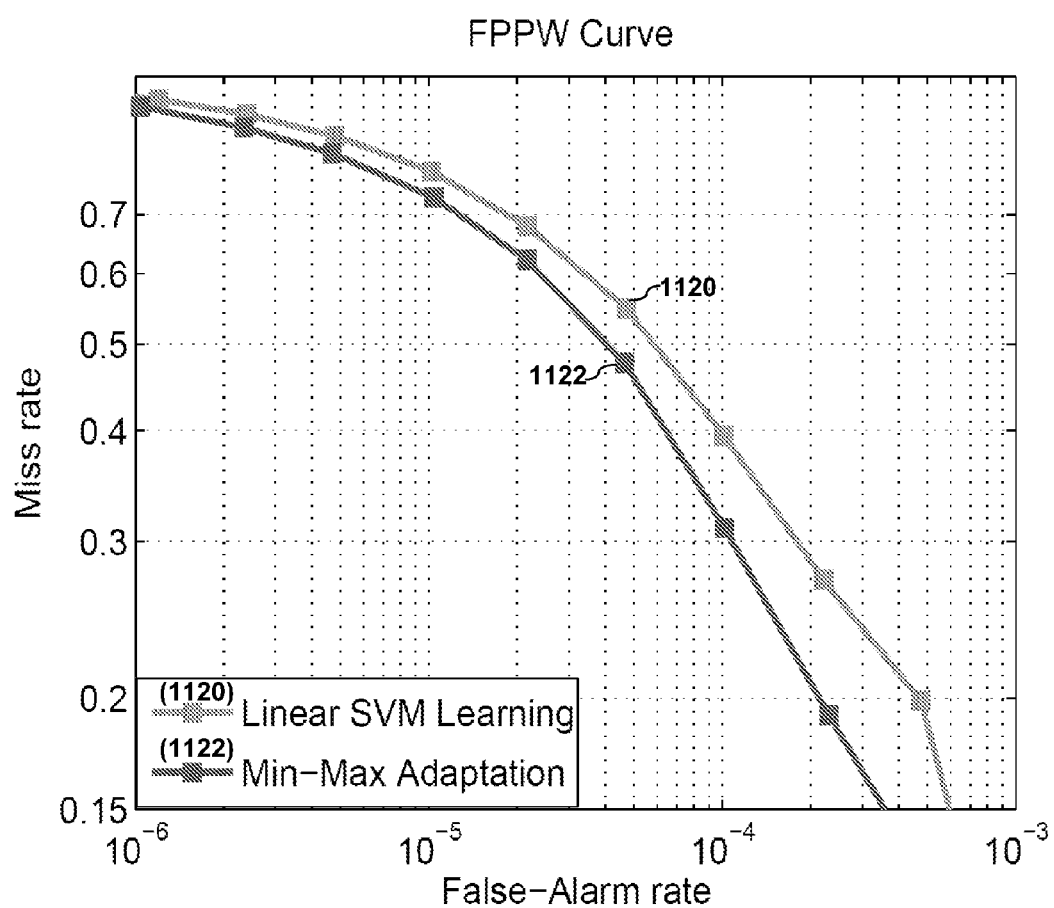
Figure 14:
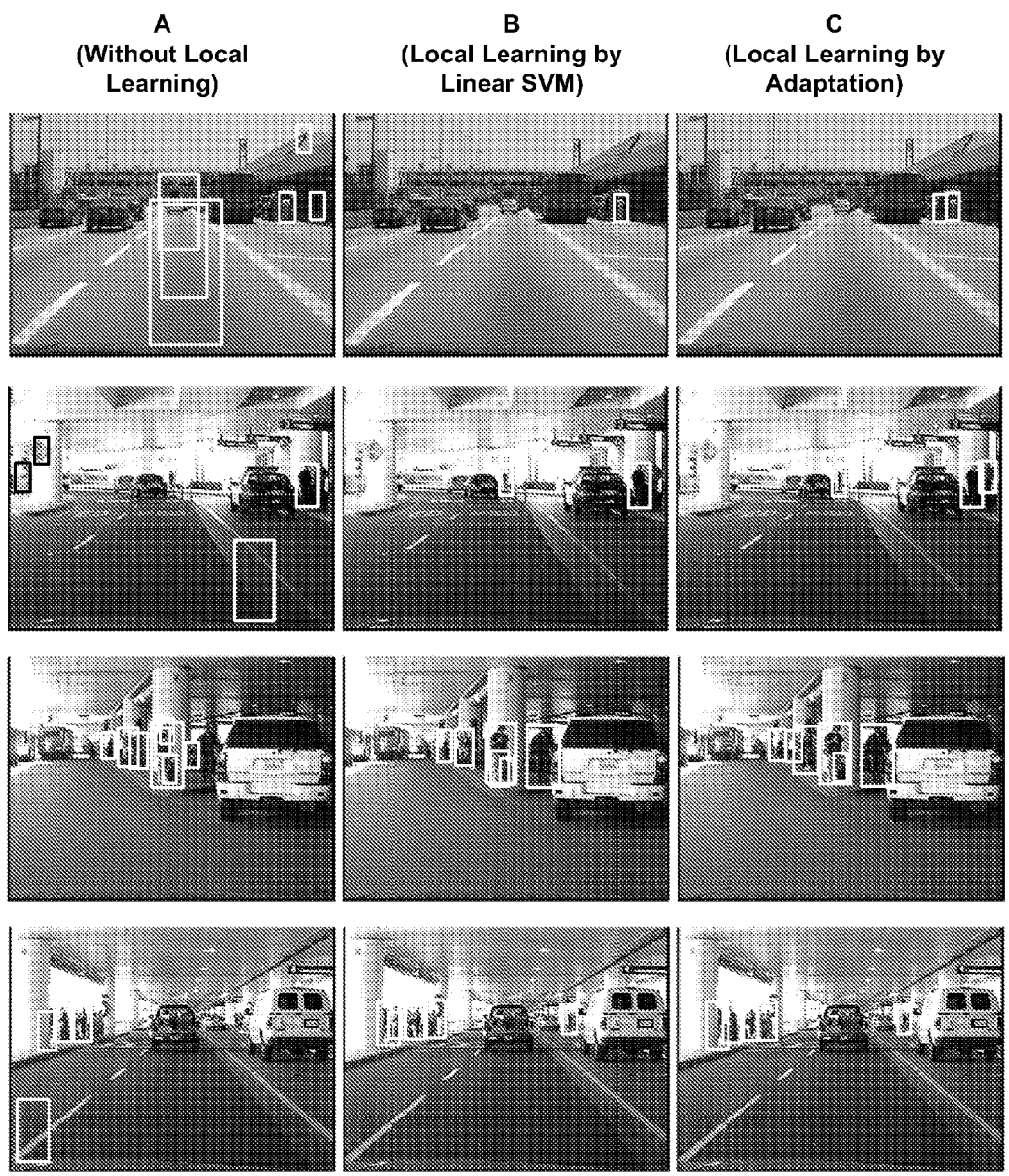
FIG. 14 depicts comparison of detection results on Caltech dataset, between one-stage global classifier without local learning (col. A), local learning by linear SVM (col. B), and local learning by Min-Max adaptation (col. C), according to embodiments of the present invention.

Following the same steps as In-House dataset, the inventors first evaluated the overall performance with different k (from 1 to 2000) using k-means clustering. FIG. 11A shows the experiment results. It shows that clusters with k=50 achieve the best result, outperforming the traditional methods by 15% at $10^{-5}$ and 35% at $10^{-4}$ in FPPW. It also outperforms that of k=2000 6%, 9% at $10^{-5}$, $10^{-4}$ FPPW. Then, an embodiment of the present invention with optimal clustering as in Algorithm 2, which automatically clusters data in 87 classes, was tested. The detection rate was similar to the best case in the previous experiment, detailed in FIG. 11B. Thirdly, the present invention's local adaptation was compared with direct local learning, as shown in FIG. 11C. Again, the Min-Max model adaptation of the present invention achieved about 10% higher detection rate at $10^{-4}$ FPPW while taking longer time to train. FIG. 14 show some example images. FIG. 14 depicts comparisons of detection results on the Caltech dataset, between one-stage global classifier without local learning (col. A), local learning by linear-SVM (col. B), and local learning adaptation (col. C), according to embodiments of the present invention. The last approach (col. C) achieves both the best detection rate and the lowest false alarm rate.

Figure 12B:
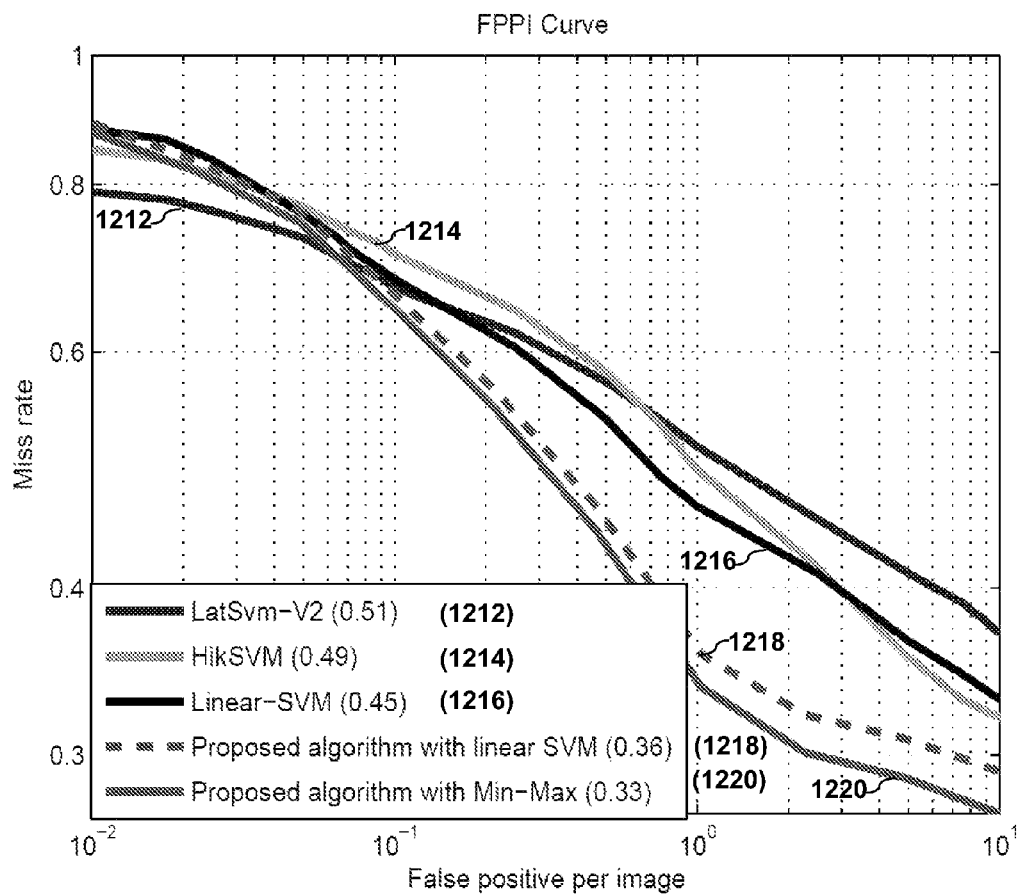

Finally, an embodiment of the present invention was compared with the most popular algorithms: Latent-SVM (Ref. 7), Hik-SVM (Ref. 8), Linear-SVM (Ref. 2) using the Caltech datasets. Again, all experiment settings (e.g., same features, training/testing data, non-maximal suppression scheme, etc.) were kept identical for all competing algorithms. As shown in FIG. 12B, the proposed algorithm according to the present invention won by 18%, 16%, and 12%, respectively, at FPPI=1.

Comparison with State-of-the-Art.

Figure 12C:
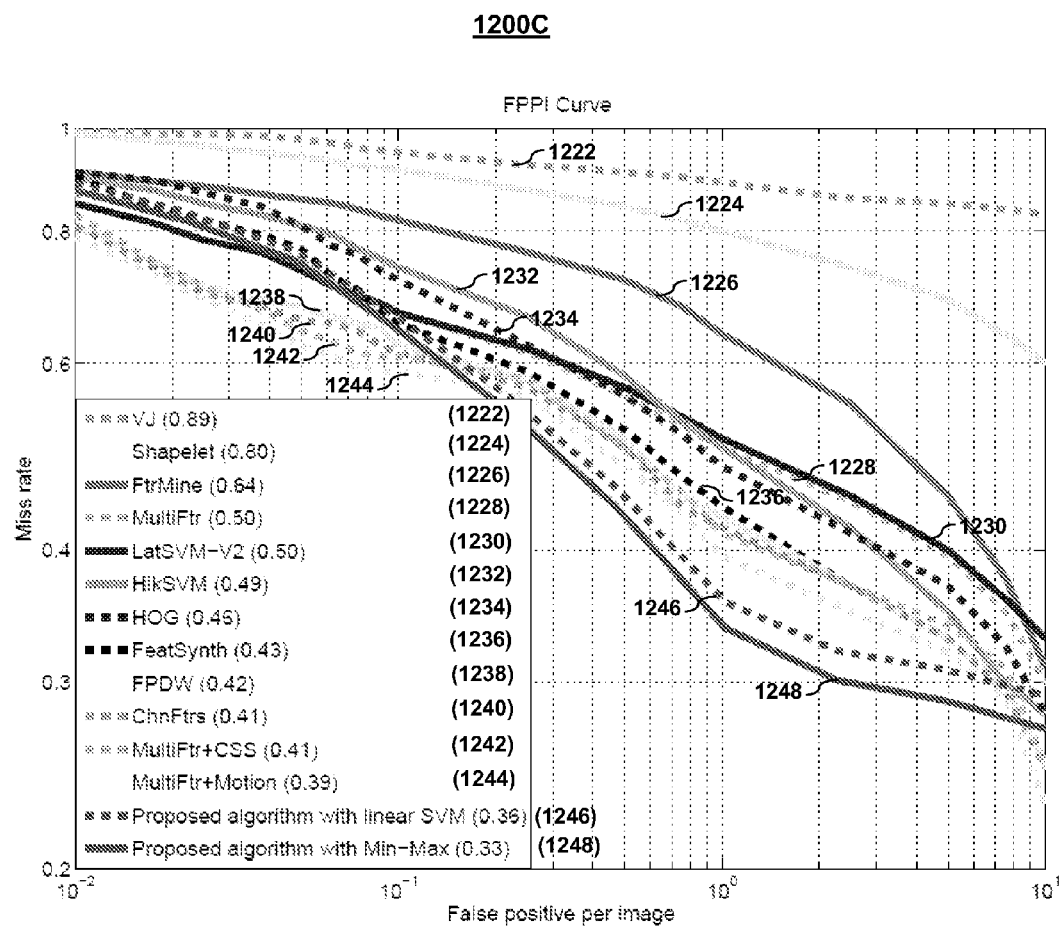
FIG. 12C depicts comparison between an embodiment of the present invention and twelve state-of-the-art algorithms on the Caltech training dataset—adopting the same experimental settings and evaluation methodology as Ref. 1 (defined below). The figure is plotted as miss-rate with respect to FPPI.

The authors in Ref. 1 compared numerous state-of-the-art algorithms using the Caltech training dataset. They assumed that the original authors of different algorithms know best how to tune their algorithms, and directly used detectors trained by the original authors for comparison. Indeed, it is impractical to access and retrain all state-of-the-art algorithms with the same setup. Therefore, the inventors adopted the same evaluation methodology in Ref. 1 to compare embodiments of the present invention with these approaches. FIG. 12C compares the FPPI between an embodiment of the present invention and the 12 algorithms in Ref. 1. As can been seen, although the embodiment used to obtain results for FIG. 12C only used HOG feature while most recent algorithms adopted more discriminative features, the embodiment of the present invention achieved the lowest miss rate at 1 FPPI, 6% lower than the best shown in Ref. 1. Also, the log-average miss rates were calculated as in Ref. 1 for the top-performing methods in FIGS. 12B and 12C and are as follows: Latent-SVM 62%, Hik-SVM 68%, Linear-SVM 65%, FeatSynth 68%, MultiFtr+CSS 61%, MultiFtr+Motion 55%, and an embodiment of the present invention 53%. Clearly, the methodology of the present patent document worked best. Note that the embodiment used HOG only while the state-of-the-art used HOG, CSS (a self-similarity of low-level features as discussed in "New Features and Insights for Pedestrian Detection," by Stefan Walk, Nikodem Majer, Konrad Schindler, Bernt Schiele, in IEEE Conference on Computer Vision and Pattern Recognition (CVPR 2010), which is incorporated by reference herein in its entirety) and even motion features HOF (Histogram of Optical Flow) from videos.

D. INRIA Dataset

INRIA dataset is also popular for researchers to evaluate human detectors. Experiments were performed using it to show the advantages of embodiments of the present invention to optimize model complexity and prevent from overfitting—the experiments also present its robustness on handling complex backgrounds and using different kinds of features.

Figure 13:
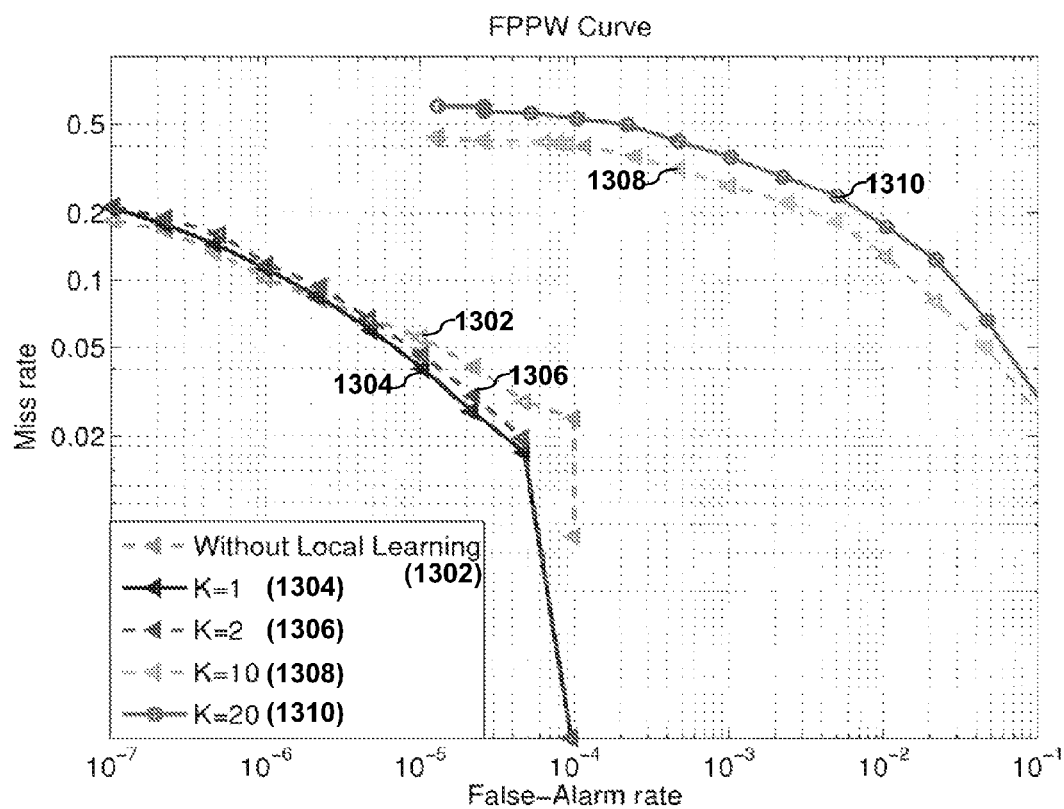
FIG. 13 depicts evaluation results of local SVM learning after k-means clustering on INRIA dataset according to embodiments of the present invention. In embodiments, when k=1 or 2, the performance increases slightly. However, in embodiments, further increasing k deteriorates the performance quickly.

Again, testing the performance started with different k values using k-means clustering. As shown in FIG. 13, when k=1 or 2, the performance has a little improvement over that without local adaptation. However, when the cluster number increases, the performance decreases dramatically. When k=10, the performance drastically decreases by 50% at $10^{-4}$ FPPW. Hence, k=1 or 2 is the best choice. This again confirms the importance of balancing model complexity and learning capacity for ensuring good performance. Indeed, the traditional method (HOG+LBP) has already achieved an impressively high detection rate, and the few remaining ambiguous data are difficult to be clustered in feature space (only 2% miss detection in $10^{-4}$ FPPW). Therefore, inappropriately dividing the data into clusters leads to over-fitting and over-increases the model complexity. This breaks the balance with learning capacity and deteriorates the overall performance. Fortunately, the embodiments of the automatic clustering algorithm of the present invention can still correctly compute the proper number of cluster as 1, thus ensures reliable local learning.

E. Computational Complexity in Testing

Compared with one-stage learning methods, the only extra computation for embodiments of the present invention is cluster query and classification by corresponding local classifier. Since embodiments of the present invention use hierarchical k-means with cluster number $k_0$ before fast spectral clustering, the cluster query computes log $(k_0)$ times of distance, while SVM-KNN needs at least log $(n_{train})$ times ($n_{train}$ is the number of samples in training set, where $n_{train} \gg k_0$), and more cost on training kernel SVM during test. In experiments conducted by the inventors, adding the local adaptive stage only takes less than 10% extra time during test: for 640×480 images scanned at 50 scales with minimal window size 25×50, adopting HOG as descriptors and linear SVM as global and local classifiers, embodiments of the present invention runs 3 seconds per frame on a Intel CoreDuo 2.8 GHz CPU.

Presented herein were embodiments of a hybrid learning algorithm combining global classification and local adaptations, which automatically adjusts model complexity according to data distribution. In embodiments, the adaptation algorithm automatically determines model complexity of the local learning algorithm according to the distribution of the training samples. In term of classification algorithm, it has been shown that embodiments of the present invention effectively improve the performance compared with the state-of-art methods, especially when using similar features.

The recently proposed features such as MultiFtr+Motion (e.g., Wojek, C., Roth, S., Schindler, K., Schiele, B., "Monocular 3D scene modeling and inference: understanding multi-object traffic scenes," in European Conference on Computer Vision (2010), which is incorporated by reference herein, in its entirety) and Multi-Resolution Features (e.g., Park, D., Ramanan, D., Fowlkes, C., "Multiresolution models for object detection," in European Conference on Computer Vision (2010), which is incorporated by reference herein, in its entirety) have been successfully used for pedestrian detection and achieved highly competitive results. One skilled in the art shall recognize that such features may be incorporated into embodiments of the hybrid learning algorithm presented herein, which may help further improve the detection performance.

6. Computing System Embodiments

Figure 15:
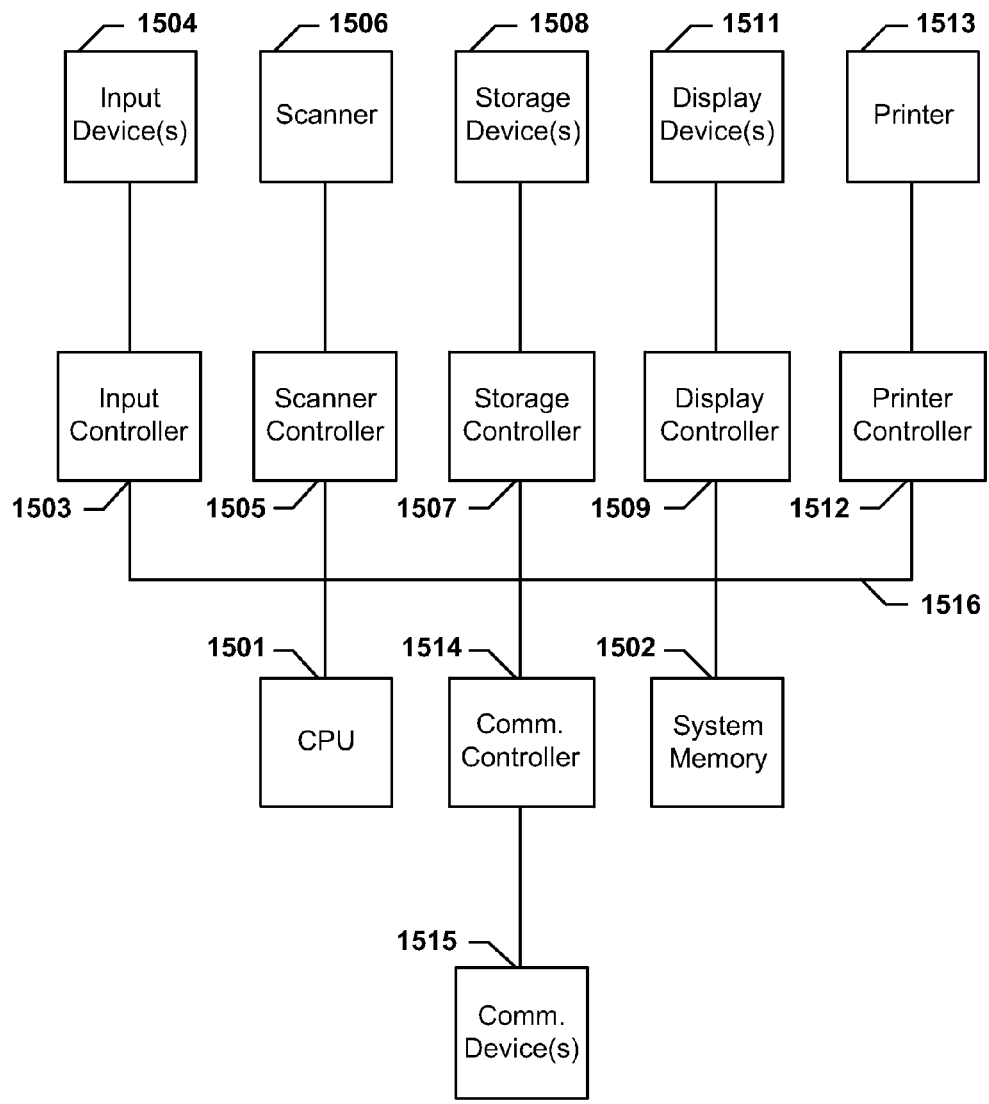
FIG. 15 depicts a block diagram illustrating an exemplary system which may be used to implement aspects of the present invention.

Having described the details of the invention, an exemplary system 1500, which may be used to implement one or more aspects of the present invention, will now be described with reference to FIG. 15. As illustrated in FIG. 15, the system includes a central processing unit (CPU) 1501 that provides computing resources and controls the computer. The CPU 1501 may be implemented with a microprocessor or the like, and may also include a graphics processor and/or a floating point coprocessor for mathematical computations. The system 1500 may also include system memory 1502, which may be in the form of random-access memory (RAM) and read-only memory (ROM).

A number of controllers and peripheral devices may also be provided, as shown in FIG. 15. An input controller 1503 represents an interface to various input device(s) 1504, such as a keyboard, mouse, or stylus. There may also be a scanner controller 1505, which communicates with a scanner 1506. The system 1500 may also include a storage controller 1507 for interfacing with one or more storage devices 1508 each of which includes a storage medium such as magnetic tape or disk, or an optical medium that might be used to record programs of instructions for operating systems, utilities and applications which may include embodiments of programs that implement various aspects of the present invention. Storage device(s) 1508 may also be used to store processed data or data to be processed in accordance with the invention. The system 1500 may also include a display controller 1509 for providing an interface to a display device 1511, which may be a cathode ray tube (CRT), a thin film transistor (TFT) display, or other type of display. The system 1500 may also include a printer controller 1512 for communicating with a printer 1513. A communications controller 1514 may interface with one or more communication devices 1515, which enables the system 1500 to connect to remote devices through any of a variety of networks including the Internet, a local area network (LAN), a wide area network (WAN), or through any suitable electromagnetic carrier signals including infrared signals.

In the illustrated system, all major system components may connect to a bus 1516, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, and variations will be apparent in light of the foregoing description. Thus, the inventions described herein are intended to embrace all such alternatives, modifications, applications and variations as may fall within the spirit and scope of the appended claims.

What is claimed is:

1. A computer-implemented method for training a detection system for detecting an object in an image, the method comprising:
   obtaining a set of image patches, wherein each image patch is associated with a label indicating whether or not the image patch contains the object and with at least one feature;
   using the features of the set of image patches to train a global classifier;
   applying the global classifier to the features of the set of image patches to identify a set of ambiguous features that have response values from the global classifier that are within an ambiguous response value range;
   selecting a number of clusters to cluster the set of ambiguous features based at least in part on detection accuracy of classifiers trained using different clustering;
   clustering the set of ambiguous features using the selected number of clusters; and
   for each cluster, using the ambiguous features associated with the cluster and the labels associated with those features to train a local classifier for that cluster;
   wherein the step of selecting a number of clusters to cluster the set of ambiguous features based at least in part on detection accuracy of classifiers trained using different clustering, comprises:
   separating the set of ambiguous features into a training set and a validation set;
   computing eigenvalues using an affinity matrix formed using the training set;
   identify eigenvalues for generating a set of candidate pairs of spectral clustering parameters $\alpha$ and $\beta$;
   for each candidate pair of spectral clustering parameters $\alpha$ and $\beta$:
   using the candidate pair of parameters $\alpha$ and $\beta$ to cluster a training set;
   for each cluster, using the ambiguous features associated with the cluster and the labels associated with those ambiguous features to train a local classifier for that cluster; and
   evaluating the local classifiers using the validation set and compute an error value; and
   selecting the candidate pair of parameters $\alpha$ and $\beta$ for the training set associated with the error value that is the lowest.

2. The computer-implemented method of claim 1 wherein the step of using the ambiguous features associated with the cluster and the labels associated with those features to train a local classifier for that cluster comprises:
   adapting the global classifier using the ambiguous features for the cluster to obtain the local classifier.

3. The computer-implemented method of claim 2 wherein the step of adapting the global classifier using the ambiguous features for the cluster to obtain the local classifier comprises:
   using local learning by Min-Max adaption to adapt the global classifier for the cluster.

4. The computer-implemented method of claim 1 further comprising:
   repeating the steps of claim 1 with a training set and a validation set having different groupings of ambiguous features from the set of ambiguous features;
   assigning parameters $\alpha$ and $\beta$ for the set of ambiguous features as a weighted average of the selected candidate pairs of parameters $\alpha$ and $\beta$ for the training sets; and
   using the assigned parameters $\alpha$ and $\beta$ in spectral clustering to cluster the set of ambiguous features.

5. The computer-implemented method of claim 1 wherein the step of using the ambiguous features associated with the cluster and the labels associated with those ambiguous features to train a local classifier for that cluster comprises:
   adapting the global classifier using the ambiguous features for the cluster to obtain the local classifier.

6. The computer-implemented method of claim 5 wherein the step of adapting the global classifier using the ambiguous features for the cluster to obtain the local classifier comprises:
   using local learning by Min-Max adaption to adapt the global classifier for the cluster.

7. A non-transitory computer-readable medium or media comprising one or more sequences of instructions which, when executed by one or more processors, causes the steps of claim 1 to be performed.

8. The computer-implemented method of claim 1, wherein said ambiguous response value range comprises a value range between a positive response value range and a negative response value range, response values within said positive response value range being deemed to indicate that said object is in the image, response values within said negative response value range being deemed to indicate that said object is not within the image, and response values within said ambiguous response value range being deemed inconclusive and unable to indicate whether the object is or is not in the image.

9. A computer-implemented method for detecting an object in an image, the method comprising:
   for each image patch from a set of image patches, applying a pre-trained global classifier to at least one feature associated with the image patch to obtain a global classifier response value;
   based upon the global classifier response value, classifying each of the image patches from the set of image patches into one of three categories: positive, which indicates that the object has been deemed to be detected in the image patch; negative, which indicates that the object has not been deemed to be detected in the image patch; or ambiguous;
   for each image patch that was categorized as ambiguous:
   using the at least one feature of the image patch to associate the at least one feature with an ambiguous feature cluster from a set of ambiguous feature clusters, the ambiguous feature cluster having a classifier associated with it;
   applying the classifier to the at least one feature of the image patch to obtain a response value; and based upon the response value, classifying the image patch into one of at least two categories: positive, which indicates that the object has been deemed to be detected in the image patch; and negative, which indicates that the object has not been deemed to be detected in the image patch;

wherein the classifier for each ambiguous feature cluster is obtained by performing steps including a step of adapting of the global classifier using ambiguous features in the ambiguous feature cluster;

wherein each ambiguous feature cluster has an average feature value and the step of using the at least one feature of the image patch to associate the at least one feature with an ambiguous feature cluster from a set of ambiguous feature clusters, the ambiguous feature cluster having a classifier associated with it, comprises:

finding the ambiguous feature cluster that has a smallest distance between its average feature value and the at least one feature of the image patch.

10. The computer-implemented method of claim 9 wherein the step of adapting the global classifier using ambiguous features in the ambiguous feature cluster to obtain the classifier comprises:

using local learning by Min-Max adaption to adapt the global classifier for the ambiguous feature cluster.

11. A non-transitory computer-readable medium or media comprising one or more sequences of instructions which, when executed by one or more processors, causes the steps of claim 9 to be performed.

12. The computer-implemented method of claim 9, wherein the negative category indicates that the object has been deemed to not be in the image patch, and the ambiguous category indicates an inconclusive response unable to indicate whether the object is or is not in the image path.

13. A system for detecting an object in an image, the system comprising:
one or more processors; and
a non-transitory computer-readable medium or media comprising one or more sequences of instructions which, when executed by the one or more processors, causes steps to be performed comprising:
for each image patch from a set of image patches, applying a pre-trained global classifier to at least one feature associated with the image patch to obtain a global classifier response value;
based upon the global classifier response value, classifying each of the image patches from the set of image patches into one of three categories: positive, which indicates that the object has been deemed to be detected in the image patch; negative, which indicates that the object has not been deemed to be detected in the image patch; or ambiguous;
for each image patch that was categorized as ambiguous:
using the at least one feature of the image patch to associate the at least one feature with an ambiguous feature cluster from a set of ambiguous feature clusters, the ambiguous feature cluster having a classifier associated with it;
applying the classifier to the at least one feature of the image patch to obtain a response value; and
based upon the response value, classifying the image patch into one of at least two categories: positive, which indicates that the object has been deemed to be detected in the image patch; and negative, which indicates that the object has not been deemed to be detected in the image patch;

wherein the classifier for each ambiguous feature cluster obtained by performing steps including a step of adapting global classifier using ambiguous features in the ambiguous feature cluster;

wherein each ambiguous feature cluster has an average feature value and the step of using the at least one feature of the image patch to associate the at least one feature with an ambiguous feature cluster from a set of ambiguous feature clusters, the ambiguous feature cluster having a classifier associated with it, comprises:

finding the ambiguous feature cluster that has a smallest distance between its average feature value and the at least one feature of the image patch.

14. The system of claim 13 wherein the step of adapting the global classifier using ambiguous features in the ambiguous feature cluster to obtain the classifier comprises:

using local learning by Min-Max adaption to adapt the global classifier for the ambiguous feature cluster.

15. The system of claim 13 wherein the non-transitory computer-readable medium or media further comprising one or more sequences of instructions which, when executed by the one or more processors, causes a method of obtaining the pre-trained global classifier and the set of ambiguous feature clusters, the method comprising:

obtaining a set of image patches, wherein each image patch is associated with a label indicating whether or not the image patch contains the object and with at least one feature;

using the features of the set of image patches to train a global classifier;

applying the global classifier to the features of the set of image patches to identify a set of ambiguous features that have response values from the global classifier that are within an ambiguous response value range;

selecting a number of clusters to cluster the set of ambiguous features based at least in part on detection accuracy of classifiers trained using different clustering;

clustering the set of ambiguous features using the selected number of clusters; and for each cluster, using the ambiguous features associated with the cluster and the labels associated with those features to train a local classifier for that cluster.

16. The system of claim 15 wherein the step of selecting a number of clusters to cluster the set of ambiguous features based at least in part on detection accuracy of classifiers trained using different clustering, comprises:

separating the set of ambiguous features into a training set and a validation set;

computing eigenvalues using an affinity matrix formed using the training set;

identify eigenvalues for generating a set of candidate pairs of spectral clustering parameters $\alpha$ and $\beta$;

for each candidate pair of spectral clustering parameters $\alpha$ and $\beta$;

using the candidate pair of parameters $\alpha$ and $\beta$ to cluster the training set;

for each cluster, using the ambiguous features associated with the cluster and the labels associated with those ambiguous features to train a local classifier for that cluster; and evaluating the local classifiers using the validation set and compute an error value; and selecting the candidate pair of parameters $\alpha$ and $\beta$ for the training set associated with the error value that is the lowest.

17. The system of claim 16 further comprising:
repeating the steps of claim 16 with a training set and a validation set having different groupings of ambiguous features from the set of ambiguous features;
assigning parameters $\alpha$ and $\beta$ for the set of ambiguous features as a weighted average of the selected candidate pairs of parameters $\alpha$ and $\beta$ for the training sets; and
using the assigned parameters $\alpha$ and $\beta$ in spectral clustering to cluster the set of ambiguous features.

18. The system of claim 13, wherein the negative category indicates that the object has been deemed to not be in the image patch, and the ambiguous category indicates an inconclusive response unable to indicate whether the object is or is not in the image path.

\* \* \* \* \*